United States Patent
Takao et al.

(10) Patent No.: US 6,560,971 B2
(45) Date of Patent: May 13, 2003

(54) AIR CONDITIONING AND THERMAL STORAGE SYSTEMS USING CLATHRATE HYDRATE SLURRY

(75) Inventors: Shingo Takao, Kuki (JP); Hidemasa Ogoshi, Yokohama (JP); Shigenori Matsumoto, Kawasaki (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 10/039,949

(22) Filed: Oct. 24, 2001

(65) Prior Publication Data

US 2002/0083720 A1 Jul. 4, 2002

Related U.S. Application Data

(63) Continuation of application No. 09/396,291, filed on Sep. 15, 1999.

(30) Foreign Application Priority Data

Feb. 15, 1999 (JP) .................................. 11-036292

(51) Int. Cl.[7] ........................... F17C 5/00; F25D 5/00; F25D 17/02; C07C 9/00
(52) U.S. Cl. ............... 62/54.1; 62/4; 62/434; 62/114; 585/15
(58) Field of Search ................ 62/54.1, 434, 430, 62/4, 114; 585/15

(56) References Cited

U.S. PATENT DOCUMENTS 4,613,444 A  9/1986  Lane et al.
4,821,794 A * 4/1989 Tsai et al. .............. 165/104.17
5,123,262 A  6/1992  Laude-Bousquet
5,140,824 A * 8/1992 Hunt .............................. 62/59
6,237,346 B1  5/2001  Ogoshi et al.

FOREIGN PATENT DOCUMENTS

JP  58-168891  10/1983
JP  61-145274  7/1986
JP  10-259978  9/1998

OTHER PUBLICATIONS

U.S. patent application Ser. No. 10/155,356, Takao et al.

*Electrical Communication Daily News*, Jun. 16, 1998, pp. 1, 14 and 15, "A New Type Clathrate Cryogenic Medium Developed by NEDO Becomes Feasible in the Eco–energy City Projects".

(List continued on next page.)

*Primary Examiner*—William Doerrler
(74) *Attorney, Agent, or Firm*—Frishauf, Holtz, Goodman & Chick, P.C.

(57) ABSTRACT

A method and apparatus for making a hydrate slurry, which involves the preparation of an aqueous solution of a guest compound for forming a clathrate hydrate, cooling the aqueous solution, and contacting the aqueous solution with nuclear particles. A thermal storage method, a thermal storage apparatus, and a thermal storage medium using an aqueous solution of a clathrate hydrate, in a concentration which provides a congruent melting point or lower. A refrigerating apparatus and an air conditioner using the thermal storage apparatus and the thermal storage medium.

48 Claims, 17 Drawing Sheets

OTHER PUBLICATIONS

*The Resources & New Material News*, Jun. 15, 1998, pp. 1, 13 and 14, "NEDO Conducts Development of a New Type Cryogenic Medium in the Eco–energy City Project".

*Energy Communication Weekly*, Jun. 17, 1998, pp. 1, 9 and 10, "A New Type Cryogenic Medium Developed by NEDO Becomes Feasible, Attaining Three Times of Heat Reservation Capacity".

*The Environmental News*, Jul. 8, 1998, "Development of a New Type Cryogenic Medium Becomes Feasible".

*The Nikkei Business Daily*, Jun. 12, 1998, "NEDO Developed a New Cryogenic Medium, Reserving Cold Heat By Three Times Than That With Water".

*The Japan Industrial Journal*, Jun. 12, 1998, "New Type Clathrate Becomes Feasible—A Cryogenic Medium For Reserving Latent Heat".

*The Denki Shinbun*, Jun. 12, 1998, "Three Times in Heat–Reserving Density That of Water".

Kawasaki and Akiya, "Application of Gaseous Hydrates to Cooling Potential Storage Media", *Chemical Engineering*, 27(8), pp. 603–608 (Aug. 1982).

"New Energy Technological System for Environmental and Energy Conservation", pp. 801–803, edited by The Heat Transfer Society of Japan (Aug. 1996).

* cited by examiner (A) Hydration numbers is appox.26
(B) Hydration numbers is appro.36.

AIR CONDITIONING AND THERMAL STORAGE SYSTEMS USING CLATHRATE HYDRATE SLURRY

This application is a continuation of 09,396,291 filed Sep. 15, 1999.

BACKGROUND OF THE INVENTION

1. Field of the Invention

The present invention relates to a method and to an apparatus for making a hydrate slurry, and relates to a thermal storage method, a thermal storage apparatus, and a thermal storage medium.

2. Description of the Related Art

Some sorts of the storing heat methods have been known as follows.

(1) Thermal Storage by Chilled Water

In air conditioning, chilled water having a temperature of 5 to 7° C. is stored in a thermal storage tank when the load on an air conditioner is low. Since chilled water has a specific heat of 1 kcal/kgK, the cooling potential is merely 7 kcal/kg per 1 kg of chilled water when the usable temperature difference is 7° C. Thus, in this method, a small amount of thermal storage is disadvantageous.

(2) Thermal Storage by Heat of Fusion of Ice, etc.

Since ice has a heat of fusion of approximately 80 kcal/kg, thermal storage by partial conversion of chilled water to ice has a larger thermal storage density. For example, chilled water containing 20 percent ice by volume has a thermal storage density of approximately 28 kcal/kg including the sensible heat of chilled water when the usable temperature difference is 7° C.

Since the chilled water is cooled to a temperature of 0° C. or less in this method, the refrigerating machine must have higher power compared to thermal storage by chilled water.

(3) Thermal Storage by Materials Other than Ice

Conventional thermal storage media other than water and ice are inorganic hydrated salts, such as $LiClO_2 \cdot 3H_2O$ and $Na_2SO_4 \cdot 10H_2O + NH_4Cl$, and gaseous hydrates (see "Application of Gaseous Hydrates to Cooling Potential Storage Media" (Document 1) by Kawasaki and Akiya; Chemical Engineering, 27(8), 603–608 (1982), and "New Energy Technological System for Environmental and Energy Conservation" (Document 2); p. 802, edited by The Heat Transfer Society of Japan).

These inorganic hydrated salts have relatively large latent heats. These salts, however, do not have congruent melting points (described later), and thus the compositions of the hydrates change with the concentrations of the anhydrous salts. As a result, phase separation will occur in cooling-heating cycles and required thermal storage efficiency will not be achieved.

The gaseous hydrates disclosed in Document 1 are materials having large ozone depletion factors, for example, R11 and R12. Since R12 are present as gas under atmospheric pressure, the thermal storage apparatus requires high-pressure hermetically sealed vessels and tubes, incurring higher facility costs.

Various thermal storage apparatuses used in air conditioners have been developed based on the above-mentioned known thermal storage methods. Such thermal storage apparatuses contribute to effective use of energy. For example, off-peak power in the midnight and variable-output forms of energy, such as exhaust heat from factories, are accumulated as a cooling potential, and the accumulated cooling potential is used in air conditioners.

A typical thermal storage apparatus uses ice. Ice is produced using off-peak power in the midnight and the cooling potential accumulated in the ice is used in an air conditioner during the daytime. As described above, although ice can store a larger amount of cooling potential than water, this apparatus forms a solid ice. By that reason, it needs for a coil for producing an ice. As a result, the air conditioner is inevitably complicated and large. Furtermore, in such a thermal storage apparatus, an ice exists as a solid. Therefore, it is difficult to transport a solid ice. Since the stored ice cannot be directly fed into a heat exchanger of the air conditioner, heat exchange is performed from the stored ice to brine, which is then fed into the air conditioner. Thus, the air conditioner requires additional equipment, increasing costs. In another proposed method, the formed ice is crushed and mixed with water, and the resulting slurry is fed into the air conditioner. The slurry, however, is not maintained in a stable and constant granular distribution, because the melting point of the pulverized ice and the freezing point of water are 0° C. In this point of view, the refrigerating machine needs for a high power. In some cases, there occurs a clogging by coagulation under floating.

Some thermal storage apparatuses use hydrates. Water molecules form a cage structure. Other molecules, that is, guest molecules, are included in the cage structure of host molecules to form clathrate hydrates. The hydrates have the appearance and physical properties which resemble those of ice. The temperatures for forming the hydrates change with the type and concentration of the guest molecules and other conditions. Some hydrates are formed at temperatures above the freezing point of water.

Thus, an aqueous slurry including hydrate particles can be formed at a temperature higher than the freezing point of water by selecting the type of the guest molecule and other conditions. The hydrate slurry has a large thermal storage capacity due to a large latent heat of the hydrate, can be easily transferred via a pipe, and facilitates heat exchange. Such a hydrate slurry can be used in a conventional air conditioner using chilled water with minor modifications.

However, in actual use, the hydrate is not produced when the solidification temperature is reached. When the hydrate is cooled under the solidification temperature, the hydrate begins to be produced. This is called the supercooling phenomenon. In the case that the supercooling rate, which means the solidification temperature—the temperature just before the hydrate is produced is large, it is necessary to lower the refrigerant temperature. Because of that reason, in order to utilize the thermal storage apparatus, which uses a hydrate slurry, it is necessary to decrease said supercooling rate.

SUMMARY OF THE INVENTION

Accordingly, it is an object of the present invention to provide a thermal storage method, a thermal storage apparatus and a thermal storage medium for making a hydrate slurry, which have a high fluidity, a latent heat at 0–120° C., which will not result in coagulation of hydrate particles, and which will result in a small amount of super-cooling rate. A "hydrate" is one sort of a clathrate hydrate. Hereinafter, "hydrate" has the same meaning as "Clathrate Hydrate".

It is another object of the present invention to provide a thermal storage method, a thermal storage apparatus, and a thermal storage medium using a clathrate hydrate which has a large thermal storage density (latent heat), stable thermal characteristics, which is economical and easy to handle, and which is safe.

It is another object of the present invention to provide an air conditioner having a thermal storage apparatus having a large thermal storage capacity, a simplified configuration, and which may be compact.

In order to attain the above-mentioned object, this present invention provides a method for producing hydrant slurry, the apparatus thereof and the product thereof. That is to say;

(a) A method in accordance with the present invention, for forming a hydrate slurry by cooling an aqueous solution containing a guest compound to form hydrate particles in the aqueous solution, comprises a preparing step, a cooling step of the aqueous solution being circulated by a heat transfer face, and a contacting step for bringing the nuclear particles contact with the circulated aqueous solution to form the hydrate particles.

The circulated aqueous solution is cooled on a heat transfer face. When the cooled aqueous solution comes into contact with nuclear particles, supercooling of the aqueous solution will not occur and fine hydrate particles are easily formed in the aqueous solution. Thus, the resulting slurry has high fluidity. Fractions of the circulated aqueous solution sequentially contact with the heat transfer face and are supercooled. When the supercooled aqueous solution comes in contact with nuclear particles, hydrate particles form and the supercooled state of the aqueous solution will disappear. That is, the locally supercooled state of the aqueous solution disappears by the formation of the hydrate slurry so that the overall aqueous solution is not supercooled. The hydrate particles have high fluidity.

(b) An apparatus in accordance with the present invention, for making a hydrate slurry by cooling an aqueous solution containing a guest compound to for hydrate particles in the aqueous solution, comprises a heat exchanger having a heat transfer face for cooling the aqueous solution, the aqueous solution being circulated and cooled by contacting with the heat transfer face, and a nuclear particle-supply mechanism for supplying nuclear particles to the aqueous solution circulating in the heat exchanger. This apparatus has a simplified configuration, and any conventional apparatus can be used as this apparatus with minor modifications and minimized additional expense.

(c) An apparatus in accordance with the present invention, for making a hydrate slurry by cooling an aqueous solution containing a guest compound to form hydrate particles in the aqueous solution, comprises a heat exchanger having a heat transfer face for cooling the aqueous solution, the aqueous solution being circulated and cooled by contact with the heat transfer face, and a fine particle layer adhered to at least a part of a surface of a member in the heat exchanger in contact with the aqueous solution, the fine particle layer acting as nuclei of the hydrate particles.

The fine particle layer can prevent supercooling of the aqueous solution and does not cause malfunction of the apparatus because the fine particle layer does not float in the aqueous solution. Furthermore, the apparatus can be operated without recovery and supplement of the fine particles.

(d) An apparatus in accordance with the present invention for making the hydrate slurry which comprises:
a means for cooling an aqueous solution containing a material for forming a clathrate compound hydrate as a guest compound to form hydrate particles;
a heat exchange means for performing heat exchange between a refrigerating machine and an aqueous solution to cool the aqueous solution; and
a circulation means for circulating the aqueous solution through the heat exchange means.

(e) A method in accordance with the present invention for thermal storage using a clathrate hydrate comprises
preparing an aqueous solution containing a material for forming the clathrate hydrate so that the aqueous solution has a concentration of the material which causes a congruent melting point; and
cooling the aqueous solution to form the clathrate hydrate.
achieving a thermal storage, by making use of the clathrate hydrant.

(f) A method for thermal storage using a clathrate hydrate comprises:
preparing an aqueous solution containing a material for forming the clathrate hydrate so that the aqueous solution has a concentration lower than the concentration causing a congruent melting point;
cooling the aqueous solution to form the clathrate hydrate; and
achieving a thermal storage, by making use of the clathrate hydrant.

(g) A product in accordance with the present invention is a thermal storage medium, which is an aqueous solution containing a material for forming a clathrate hydrate.

(h) An apparatus in accordance with the present invention is an air conditioner, which comprises
a refrigerating machine; and
a thermal storage apparatus, connected to the refrigerating machine by piping, for storing a guest compound solution forming a hydrate at a temperature higher than 0° C.;
the thermal storage apparatus comprising a heat exchanger for cooling the aqueous solution by a thermal medium from the refrigerating machine to form a slurry of hydrate particles; and
the thermal storage comprising a circulator for supplying the slurry to a load-side device of the air conditioner.

DESCRIPTION OF THE PREFERRED EMBODIMENT

Preferred Embodiment 1

This preferred embodiment is characterized by a method of the present invention for forming a hydrate slurry by cooling an aqueous solution containing a guest compound to form hydrate particles in the aqueous solution. This preferred embodiment comprises a cooling step of the aqueous solution being circulated by a heat transfer face, and a contact step for bringing the nuclear particles in contact with the circulated aqueous solution to form the hydrate particles.

This preferred embodiment of the method and apparatus in accordance with the present invention will now be described with reference to the attached drawings. In this embodiment, an aqueous solution containing tetra-n-butylammonium bromide (TBAB) as a guest compound is cooled to form a hydrate slurry. Furthermore, in this embodiment, several different mechanisms are described. All of these mechanisms are not always necessary in an actual method and an actual apparatus, although method of the embodiment includes a plurality of mechanisms for facilitating description and understanding.

Figure 1:
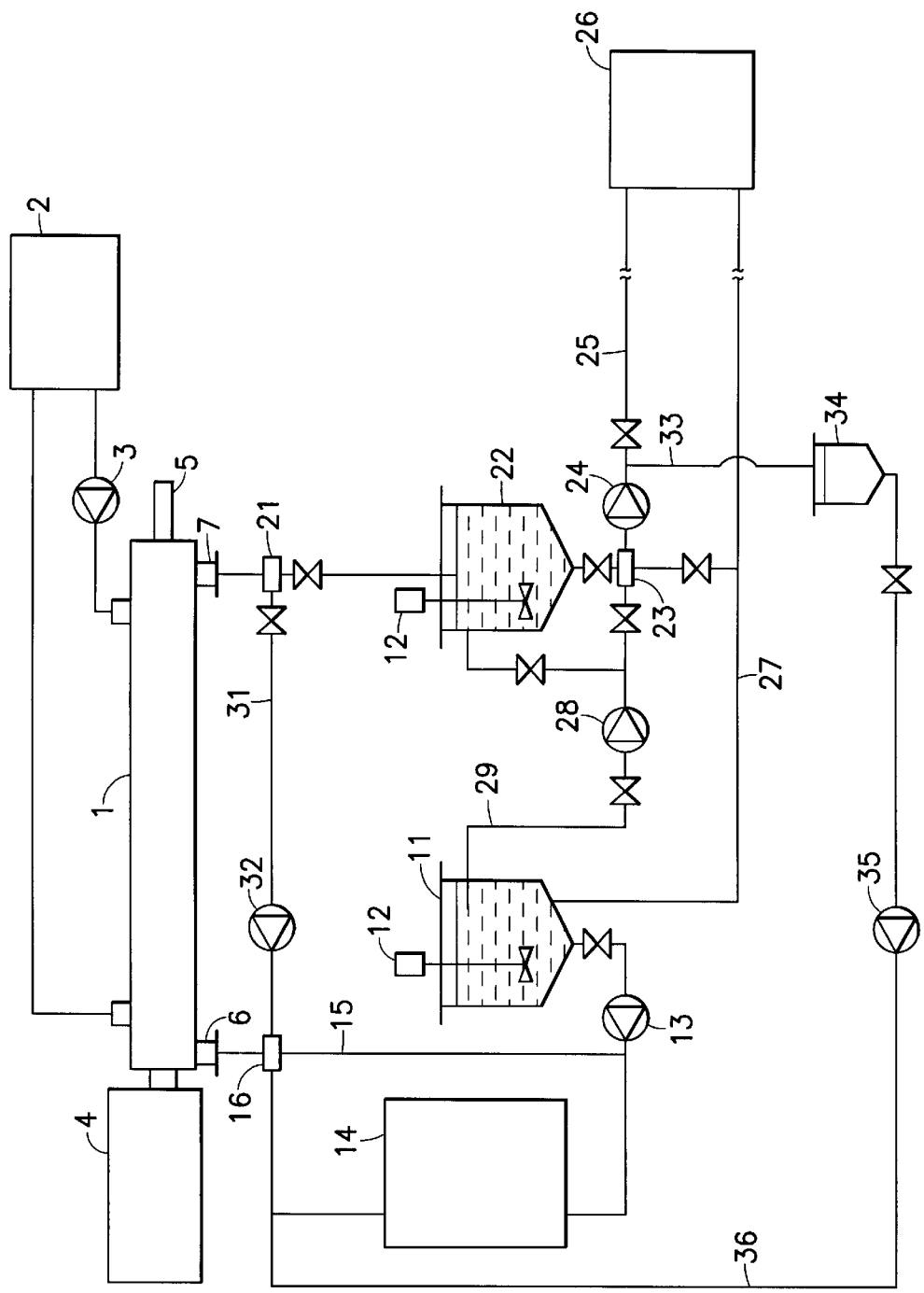
FIG. 1 is an outlined schematic diagram of an apparatus of the Preferred Embodiment 1 of the present invention.
Figure 2:
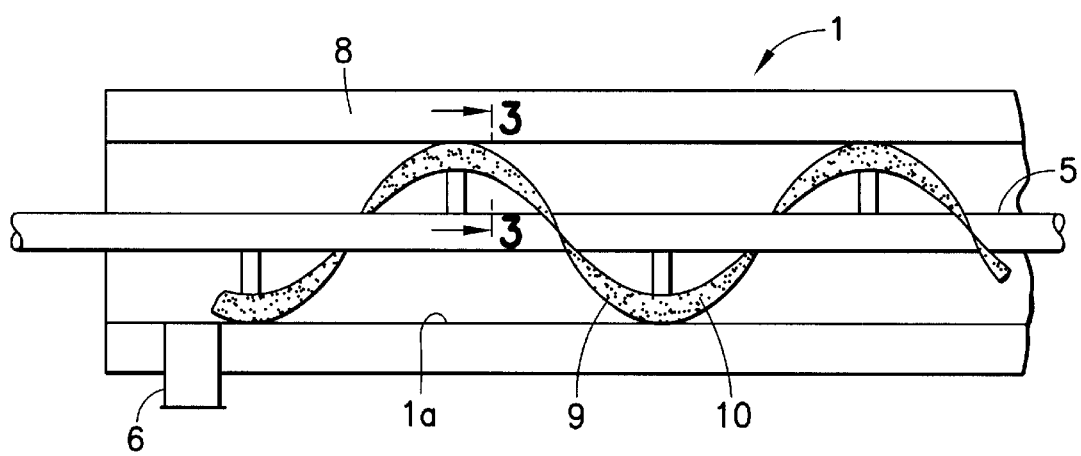
FIG. 2 is a longitudinal partial cross-sectional view of a heat exchanger of the Preferred Embodiment 1 of the present invention.

With reference to FIG. 1, a heat exchanger 1 is provided to cool the aqueous solution and to form a hydrate slurry. The heat exchanger 1 in this embodiment is cylindrical as shown in FIG. 2, and the inner face acts as a heat transfer face 1a. The heat transfer face 1a is surrounded with a cooling jacket 8. A refrigerant is fed from a refrigerating machine 2 by a pump 3 and is circulated through the cooling jacket 8 so as to cool the aqueous solution in the heat exchanger 1 and to form the hydrate.

A rotating shaft 5 is provided along the shaft axis of the heat exchanger, and has a spiral blade 9 as a rotating blade member. A driving mechanism 4 rotates the rotating shaft 5 at a given rate. The spiral blade 9 rotates on the rotating shaft 5 and slides on the heat transfer face 1a to detach the hydrate adhering to the heat transfer face 1a. Thus, the heat exchange efficiency on the heat transfer face 1a is not decreased. Since the detached hydrate is dispersed into the aqueous solution, the hydrate slurry is homogenized.

In addition, the spiral blade 9 circulates the aqueous solution in the heat exchanger 1. The aqueous solution may be circulated by any unit which can prevent formation of laminar flow of the aqueous solution along the heat transfer face 1a.

Figure 3:
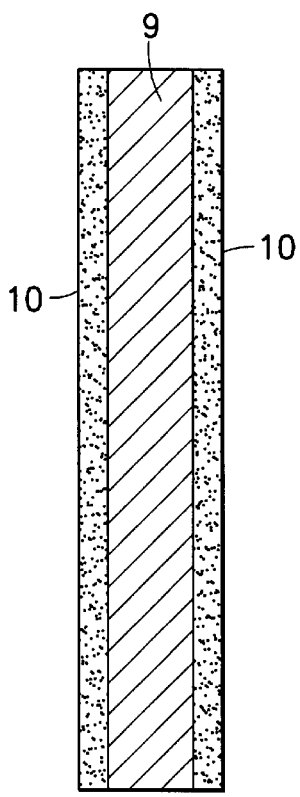
FIG. 3 is a cross-sectional view of a spiral blade member taken along line 3—3 in FIG. 2 of the Preferred Embodiment 1 of the present invention.

With reference to FIG. 3, two surfaces of the spiral blade 9 are provided with fine particle layers 10. The fine particle layers 10 are formed by, for example, coating a mixture of fine aqueous pulverized slag, which is produced by jetting water into slag in a blast furnace, and a binder. Alternatively, the fine particle layer 10 may adhere to any element in contact with the circulated aqueous solution other than the spiral blade.

A mechanism for supplying and circulating the aqueous solution to the heat exchanger 1 will now be described. An aqueous solution reservoir 11 stores the aqueous solution. The aqueous solution in the aqueous solution reservoir 11 is supplied to an inlet 6 of the heat exchanger 1 by a pump 13 via a supply tube 15 and a mixer 16.

The hydrate slurry formed by cooling in the heat exchanger 1 is discharged from an outlet 7 and is stored in a hydrate slurry tank 22. The slurry tank 22 and the aqueous solution reservoir 11 have stirrers 12.

The hydrate slurry in the hydrate slurry tank 22 is supplied to a hydrate concentration regulator 23 from the bottom of the hydrate slurry tank 22. The aqueous solution in the aqueous solution reservoir 11 is fed to the hydrate concentration regulator 23 via a tube 29 by a pump 28 to mix the hydrate slurry so that the concentration of the hydrate slurry (solid component) is controlled. The aqueous solution containing the hydrate slurry is then supplied to a load-side device 26, such as an air conditioner, via a tube 25 by a pump 24. The aqueous solution used in the load-side device 26 is recycled to the aqueous solution reservoir 11 via an inward tube 27.

A nuclear particle supply mechanism will now be described. The nuclear particle supply mechanism is provided in the above pipe line in order to prevent supercooling. The aqueous solution circulating the system contains a predetermined amount of fine particles. Various types of fine particles may be used, and aqueous pulverized slag which is inexpensive, has stable characteristics and can effectively suppress supercooling is preferably used. The aqueous pulverized slag has a specific gravity larger than that of the aqueous solution, and thus has precipitating characteristics.

A part of hydrate slurry discharged from the outlet 7 of the heat exchanger 1 is supplied to the mixer 16 from the distributor 21 via a tube 31 by a pump 32, and is supplied to the inlet 6 together with the heat exchanger 1.

A part of slurry discharged from the reservoir 22 is supplied to a hydrate particle tank 34 for preventing supercooling via a tube 33 and stored therein. The hydrate particle tank 34 is preferably a heat-insulating tank in order to store the hydrate particles without melting for a predetermined period.

The hydrate slurry in the hydrate particle tank 34 is fed to the mixer via a tube 36 by a pump 35, and then fed to the inlet 6 of the heat exchanger 1 with the aqueous solution.

This apparatus has a hydrate particle forming mechanism 14, which can be operated independently the hydrate-forming unit including the heat exchanger and produces hydrate slurry containing small amounts of hydrate particles.

The hydrate slurry produced in the hydrate particle forming mechanism 14 is supplied to the mixer 16 and then to the inlet 6 of the heat exchanger 1 with the aqueous solution.

The operation of the apparatus and the method for suppressing the supercooling will now be described. The circulated aqueous solution comes into contact with the heat transfer face 1a in the heat exchanger 1 and is cooled. The fraction of the aqueous solution is supercooled, immediately circulated in the heat exchanger 1, and then comes into contact with fine particles, that is, aqueous pulverized slag, in the fine particle layers 10 on the spiral blade 9. As a result, hydrate particles are formed to compensate the supercooling of the fraction. Accordingly, the overall aqueous solution is not supercooled in the heat exchanger 1.

Fine particles of the aqueous pulverized slag contained in the aqueous solution are partially fed into the heat exchanger with the aqueous solution. Contact of the fine particles with the supercooled fraction of the aqueous solution also forms hydrate particles to compensate the supercooling.

After these fine particles as nuclei initiate the formation of hydrate particles, these are excluded from the formed hydrate particles. The excluded fine particles in the aqueous solution are transferred to the hydrate slurry tank 22 together with the hydrate slurry. In the hydrate slurry tank 22, the fine particles are separated from the aqueous solution and precipitated on the bottom of the hydrate slurry tank 22. Thus, the fine particles floating in the aqueous solution gradually decrease during a continuous operation.

In order to solve such a problem, a part of hydrate slurry discharged from the tube 31 is fed to the heat exchanger 1 via the mixer 16 by the pump 32. The hydrate particles in the hydrate slurry can also form hydrate particles to compensate the localized supercooling. Since the type of the added hydrate particles is the same as the type of the hydrate particles to be formed, these most effectively works as nuclei for forming the hydrate. Thus, the supercooling is most effectively suppressed.

When the apparatus is reoperated after pause, no hydrate is discharged from the heat exchanger 1. In such a case, the hydrate slurry stored in the hydrate particle tank 34 is supplied to the heat exchanger 1 via the tube 36 and the inlet 6.

Even when the hydrate slurry in the hydrate particle tank 34 is completely melted, the aqueous solution in the hydrate particle tank 34 can suppress supercooling in the heat exchanger 1. That is, the fine particles deposited on the bottom of the hydrate slurry tank 22 are recovered in the hydrate particle tank 34, as described above. The fine particles supplied to the heat exchanger 1 together with the aqueous solution can suppress supercooling. Accordingly, the hydrate particle tank 34 and relevant piping lines thereof also function as a recovery and recycle mechanism of fine particles.

In a case that the hydrate slurry is not fed to the hydrate particle tank 34 when the apparatus starts up, the hydrate particle forming mechanism 14 is independently operated in advance to feed hydrate slurry formed in this mechanism 34 to the heat exchanger 1.

When the apparatus is further operated, fine particles may be completely deposited on the bottom of the hydrate slurry tank 22. Thus, fine particles floating in the aqueous solution will disappear in such a case. Before the apparatus restarts up, hydrate particles are fed to the heat exchanger 1 from the hydrate particle forming mechanism to effectively suppress supercooling in the aqueous solution.

In order to avoid description of undesirable number of embodiments, this method of the embodiment includes a plurality of mechanisms for facilitating description and understanding. All of these mechanisms, however, are not always necessary in an actual method and in an actual apparatus, and these mechanisms may be used alone or in combination.

The experimental results performed to confirm the effects of the above-mentioned embodiments will be described with reference to FIGS. 4 to 7. For comparison, an aqueous TBAB solution (25% by weight) was cooled without agitation. According to differential scanning calorimetry, the aqueous solution was supercooled to −16° C.

Figure 4:
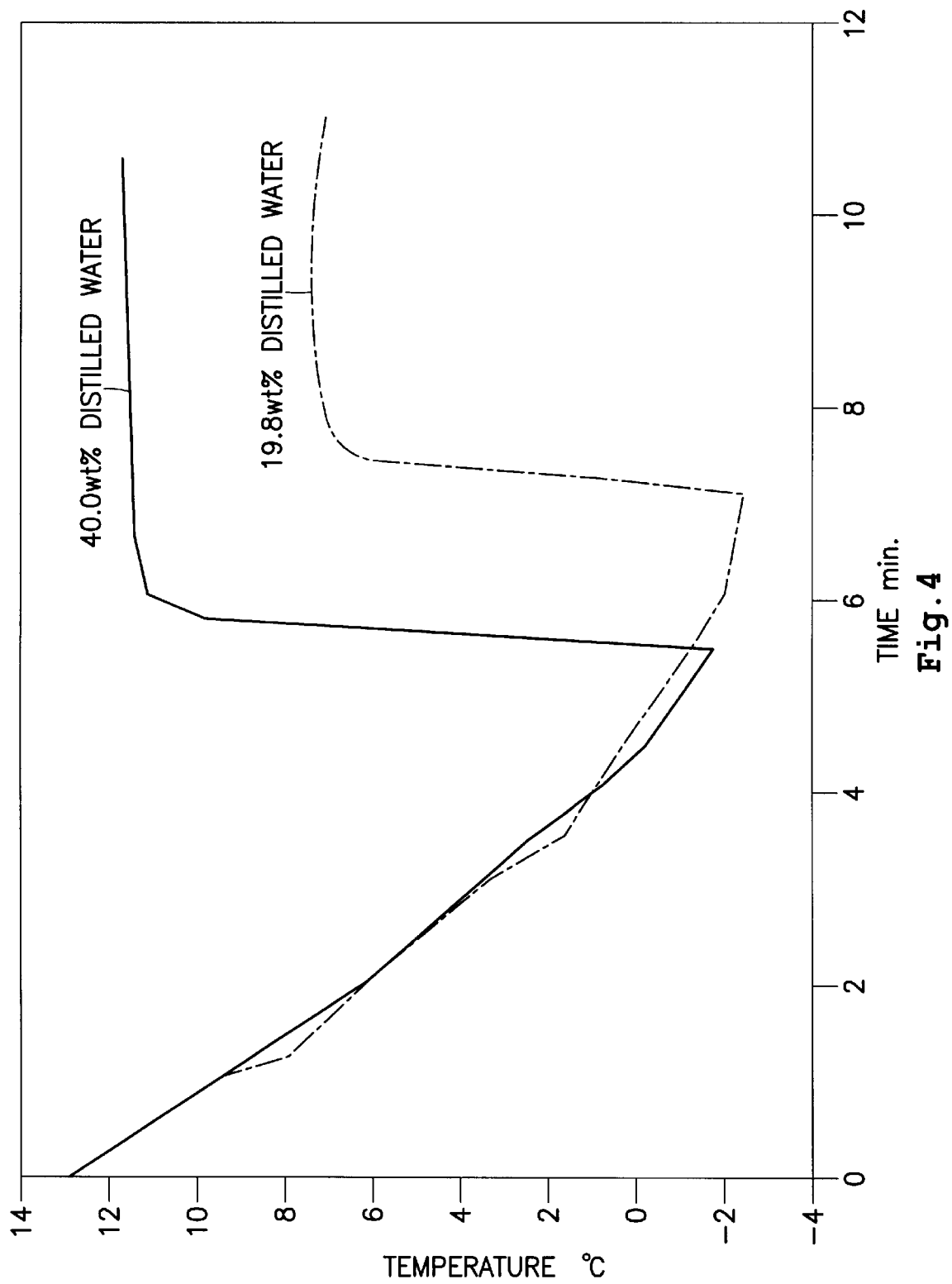
FIG. 4 is a line graph showing the experimental results performed for confirming the effects of the Preferred Embodiment 1 of the present invention.

FIG. 4 shows supercooling when no material is added to the aqueous solution. Both aqueous solutions having TBAB concentrations of 40% and 19.8%, respectively, were supercooled to approximately −2° C., as shown in FIG. 4.

Figure 5:
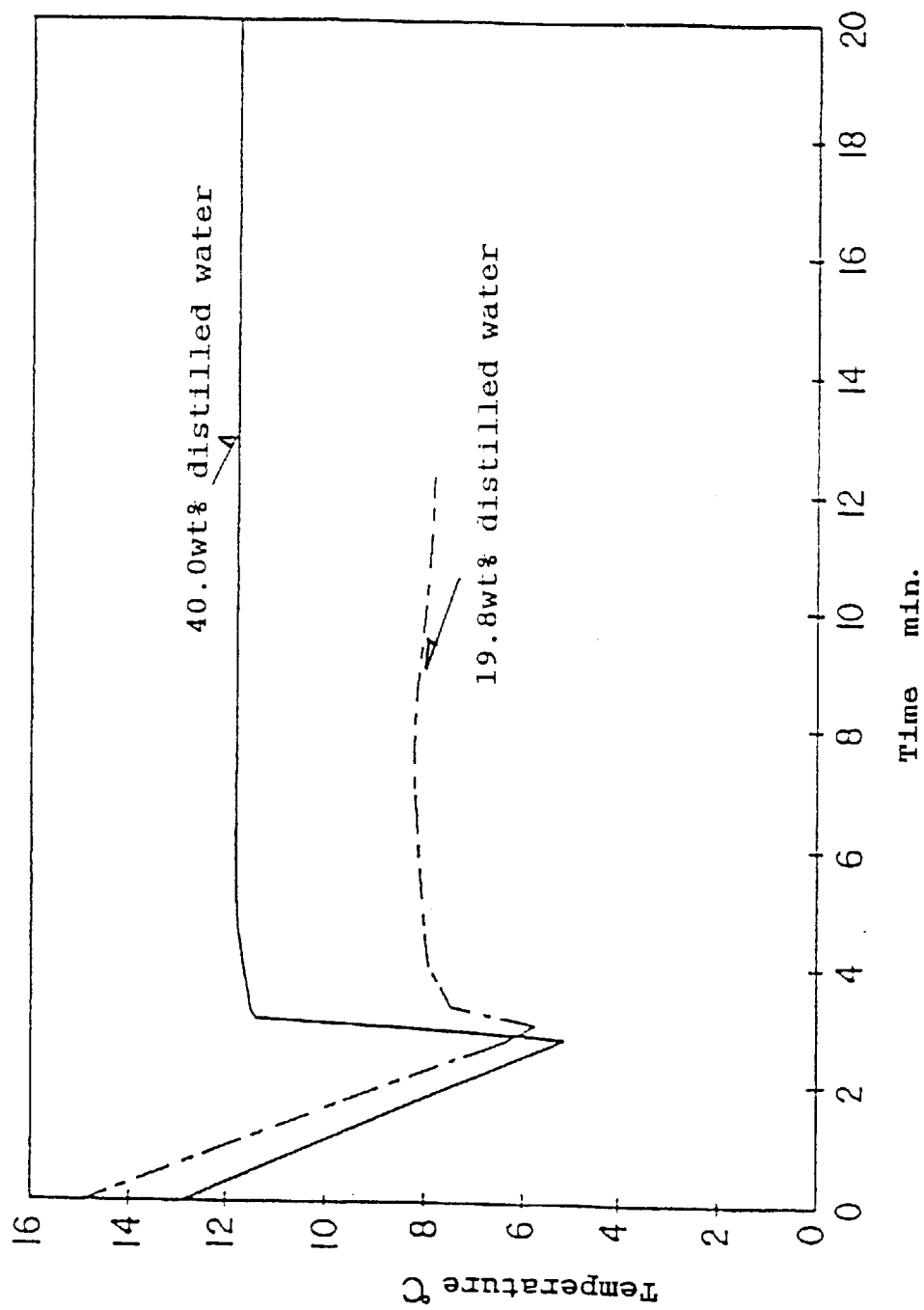
FIG. 5 is a line graph showing the experimental results performed for confirming the effects of the Preferred Embodiment 1 of the present invention.

FIG. 5 shows supercooling when aqueous pulverized slag is added to the aqueous solution. The aqueous solutions were supercooled to approximately 5° C. Thus, the aqueous pulverized slag is effective for suppressing the supercooling.

Figure 6:
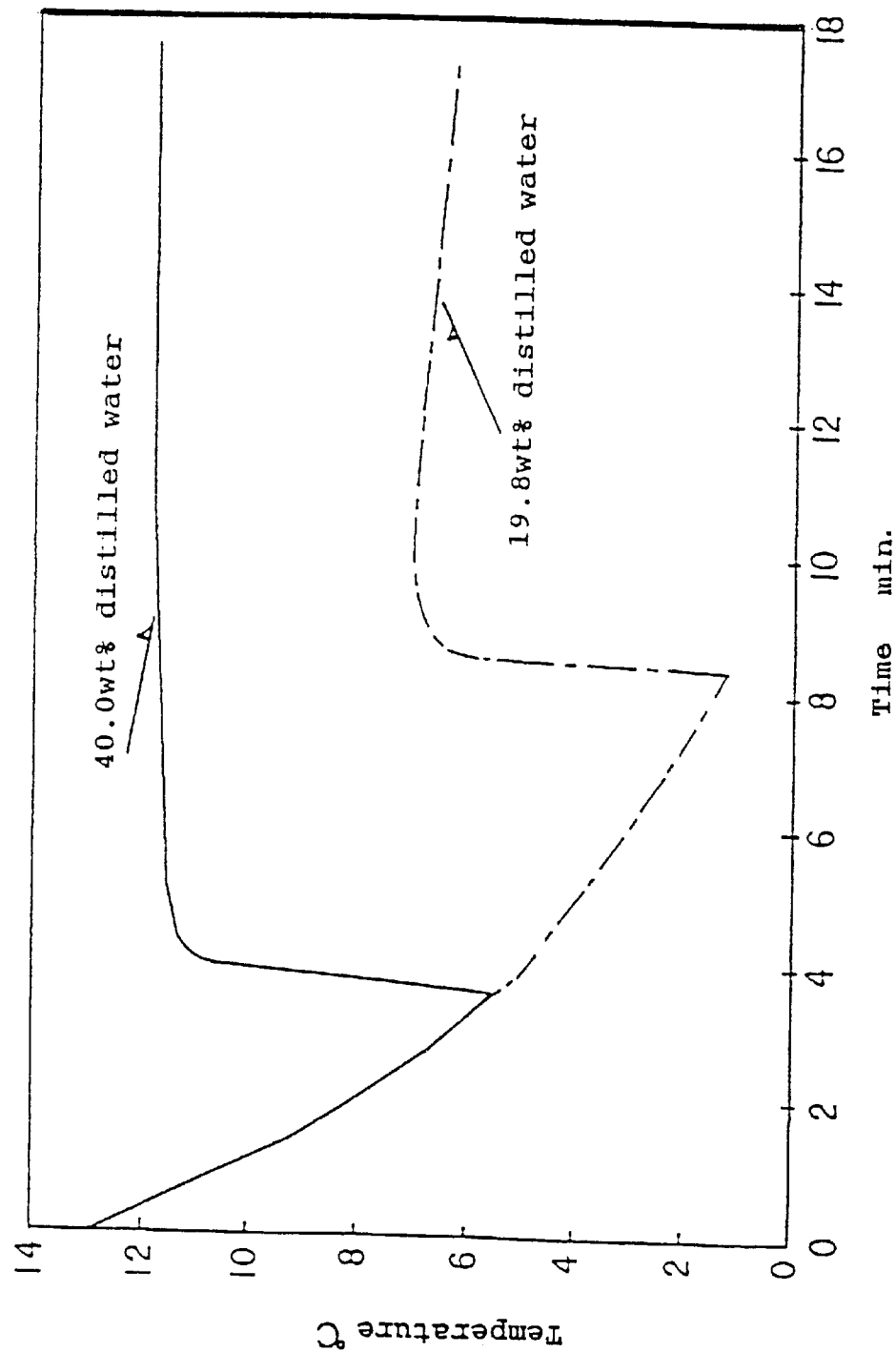
FIG. 6 is a line graph showing the experimental results performed for confirming the effects of the Preferred Embodiment 1 of the present invention.

FIG. 6 shows supercooling when a glass rod on which aqueous pulverized slag adheres is immersed into the aqueous solution. The aqueous solutions were supercooled to approximately 1° C. for the TBAB concentration of 19.8% and Lo approximately 6° C. for the TBAB concentration of 40%. The results suggest that a higher TBAB concentration is effective for suppressing the supercooling in this case.

Figure 7:
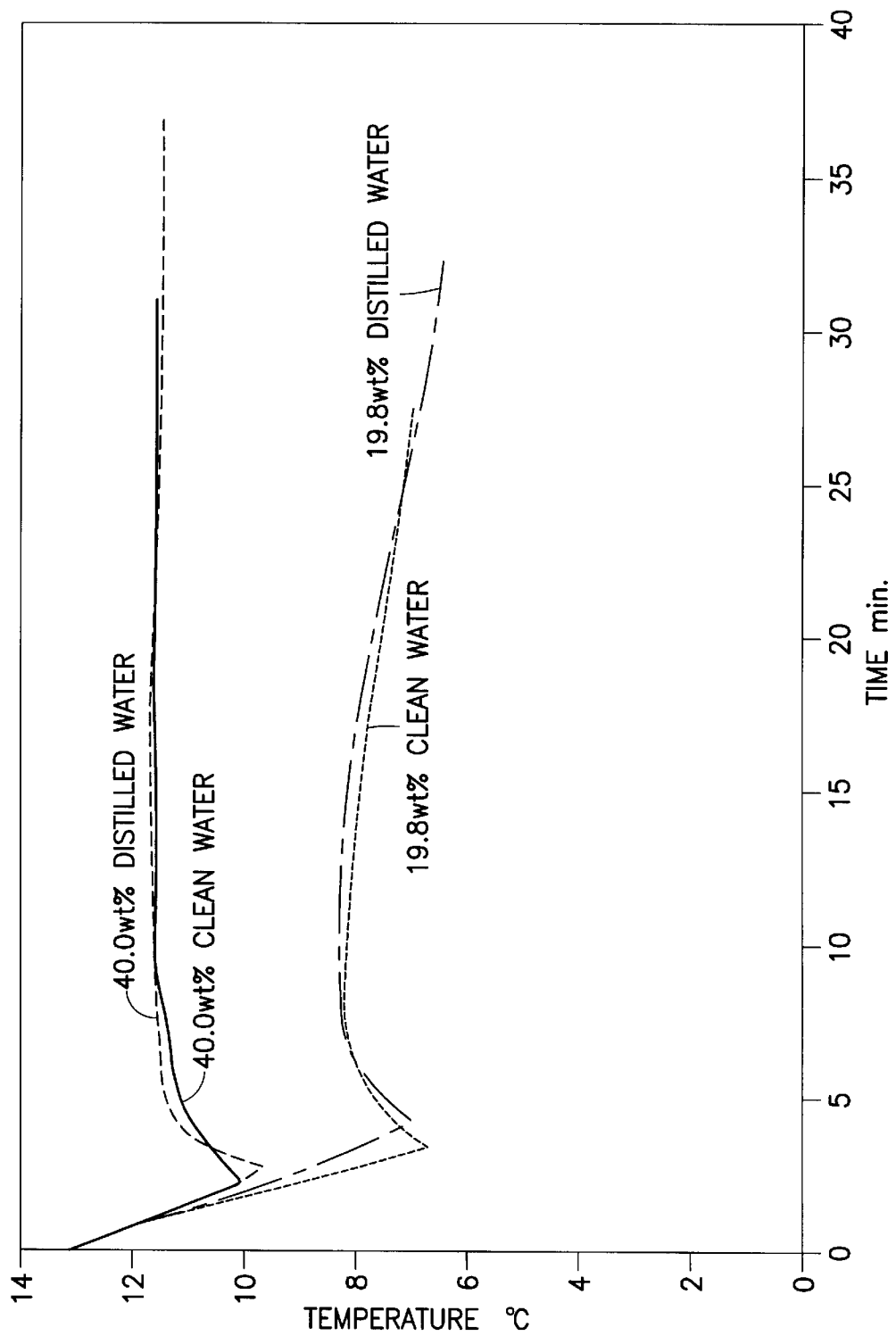
FIG. 7 is a line graph showing the experimental results performed for confirming the effects of the Preferred Embodiment 1 of the present invention.

FIG. 7 shows supercooling of the aqueous solution containing hydrate particles, wherein distilled water and clean water are used for preparation of the aqueous solutions. The aqueous solutions were supercooled to approximately 7° C. for the TBAB concentration of 19.8% and to approximately 10° C. for the TBAB concentration of 40% in both the distilled water and the clean water. Thus, this method shows significantly high effects.

The present invention is not limited to the above embodiment. For example, the use of a cooling barrel-type heat exchanger provided with spiral blade is described in the above embodiment. The present invention is applicable to a shelled-and-tube-type heat exchanger and a plate-type heat exchanger, in addition to the above type.

The fine particles used in the present invention are not limited to those having a large specific gravity. For example, fine particles having a specific gravity substantially equal to that of the aqueous solution may be used. Since such fine particles can be circulated with the aqueous solution without sedimentation, disadvantages caused by the precipitation of the fine particles can be prevented.

Furthermore, the slurry including the hydrate particles has a high fluidity. Thus, the slurry can be transferred by a pump with reduced pressure loss and without deposition of the hydrate particles on the inner wall of a tube. The hydrate slurry can be stored and transferred with small heat loss.

In addition, in this embodiment, the solution is cooled and the hydrate particles are formed with a small superheating and without increasing the power of the refrigeration.

In this embodiment, the guest compound is any one of tetra-n-butylammonium salts, tetra-iso-amylammonium salts, tetra-iso-butylphosphonium salts, and tri-iso-amylsulfonium salts. Hydrates of these guest compounds are formed at temperatures ranging from approximately 5° C. to 25° C. Thus, hydrate particles can be formed by cooling the aqueous solution using a vapor-absorption refrigerating machine. The vapor-absorption refrigerating machine can effectively use exhaust heat having a low temperature as a heat source.

Preferred Embodiment 2

This Preferred Embodiment will be described in more detail with reference to the attached drawings.

Figure 8:
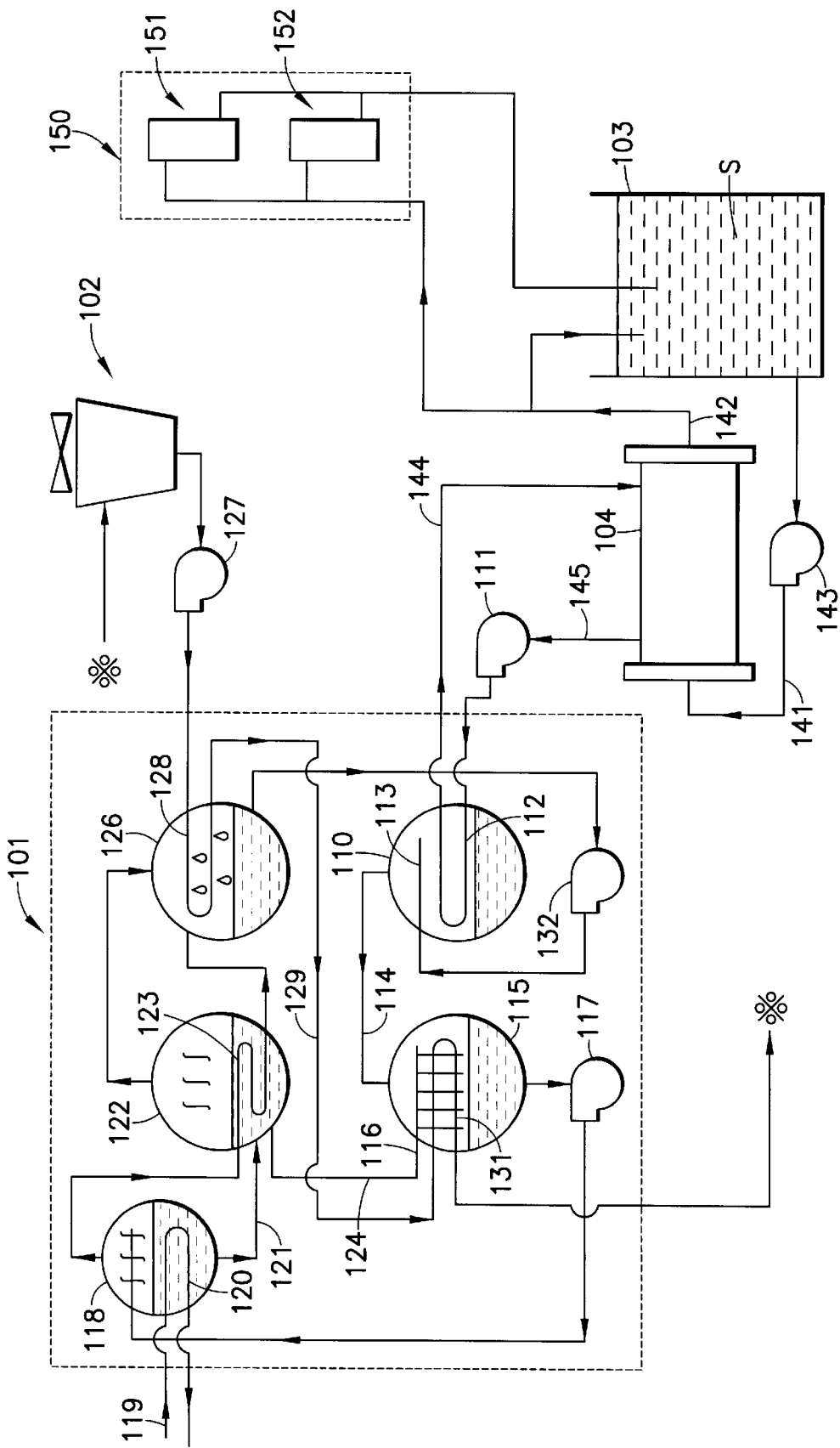
FIG. 8 is an outlined schematic diagram of the Preferred Embodiment 2 in accordance with the present invention.

FIG. 8 shows an apparatus of this Preferred Embodiment 2. This apparatus produces a hydrate slurry as a cooling potential source for air conditioners, etc. This air conditioner includes an absorption refrigerating machine, a thermal storage apparatus using a hydrate slurry, and a load-side device of the air conditioner.

A refrigerating machine of this apparatus is an absorption refrigerating machine 101 which supplies a refrigerant, that is, chilled water at approximately 4° C. The absorption refrigerating machine 101 has a cooling tower 102 and a thermal storage tank 103 for storing a hydrate slurry S composed of a mixture of an aqueous solution of a guest compound and hydrate particles. The aqueous solution in the thermal storage tank 103 is fed to a heat exchanger 104 and is cooled by heat exchange with the chilled water from the absorption refrigerating machine and forms hydrate particles. The slurry containing the hydrate particles is recycled to and stored in the thermal storage tank 103. The hydrate slurry is fed to a thermal load site of an air conditioner and used as a cooling potential source.

The absorption refrigerating machine 101 is provided with an evaporator 110. In the evaporator 110, water as a refrigerant is sprayed from a nozzle 113 and evaporated to form a low-temperature atmosphere. The evaporator 110 contains a heat exchange element of a heat transfer tube 112, and water is circulated in the heat transfer tube 12 and the heat exchanger 104 by a pump 111. For example, water at approximately 12° C. from the heat exchanger 104 is cooled to approximately 4° C. in the heat transfer tube 112 and is recycled to the heat exchanger 104.

The water vapor evaporated in the evaporator 110 is fed into an absorber 115 through a tube 114. The absorber 115 contains, for example, a lithium bromide absorbing solution. The absorbing solution is sprayed through a nozzle 116 so that the vapor from the evaporator 110 is absorbed in the absorbing solution.

The diluted absorbing solution is sent to a first generator 118 by a pump 117. The first generator 118 has a heat exchange element 120. Vapor, which is generated from a heat source at a relatively low temperature, such as exhaust heat from a factory, is fed into the heat exchange element 120. The diluted absorbing solution is thereby heated and concentrated. The concentrated absorbing solution is fed into a second generator 122 via a tube 121.

Water vapor evaporated from the absorbing solution in the first generator 118 is sent to a heat exchange element 123 in the second generator 122 and heats the absorbing solution in the second generator 122 so that the absorbing solution is further concentrated. The absorbability of the absorbing solution concentrated in two stages is sufficiently recovered. The absorbing solution is fed into the nozzle 116 in the absorber 115 to absorb vapor from the evaporator 110.

Water vapor generated in the first and second generators 118 and 122 is sent to a condenser 126. The condenser 126 has a heat exchange element 128. Cooling water is fed to the heat exchange element 128 through the cooling tower 102 by a pump 127. The water vapor is cooled and condensed in the heat exchange element 128, and the recovered water is sent to the nozzle 113 in the evaporator 110 by a pump 132 and sprayed in the evaporator 110. The cooling water from the cooling tower 102 is fed into the heat exchange element 131 in the absorber 115 through a tube 129 and cools the absorbing solution so that the vapor absorbability of the absorbing solution is improved. And then, the cooling water is returned to the cooling tower, again.

In the absorption refrigerating machine 101, water as refrigerant and the absorbing solution is circulated. Such an absorption refrigerating machine enables utilization of heat from a heat source at a relatively low temperature, and thus can effectively use exhaust heat from factories. In the absorption refrigerating machine, the cooling temperature is generally in a range of 3° C. to 15° C. Changing the type of the absorbent can expand this cooling range. When the refrigerant contains an antifreeze solution, the refrigerant has a cooling ability to temperatures below 0° C.

The configuration of the heat exchanger 104 for producing the hydrate slurry will now be described. In this embodiment, tetra-n-butylammonium bromide (hereinafter referred to as TBAB) is used as a guest compound for forming the hydrate. In case that aqueous solution concentration is 40 wt %, TBAB has a melting point of 11.8° C. And thus the aqueous solution S of TBAB forms clathrate compound hydrate when the solution S is cooled to less than 11.8° C. The TBAB hydrate has a heat of fusion of 40 to 50 kcal/kg, and thus has a high cooling potential.

The guest compound is not limited to TBAB. Examples of other usable guest compounds include tetra-n-butylammonium salts, tetra-iso-amylammonium salts, tetra-iso-butylphosphonium salts, and tri-iso-amylsulfonium salts. The melting points of the hydrates of these guest compounds are in a range of approximately 5° C. to 25° C. This range corresponds to the cooling temperature range of the absorption refrigerating machine 101. Thus, these guest compounds are preferably used in such absorption refrigerating machines.

As described above, this apparatus can effectively produce the hydrate slurry. Therefore, the hydrate slurry is stored in the thermal storage tank 103, using an exhaust heat from factories, and then the stored hydrate slurry can be supplied to air conditioners. Such a system compensates for an imbalance between a change in the supplied exhaust heat and a change on load in the air conditioners. Furthermore, this system can more effectively use energy.

The hydrant materials can be formed in the following process.

First, one molecule of the guest compound is included in the host structure composed of several numbers of water molecules. Suppose that the host structure is composed of 26 water molecules in TBAB. When an aqueous solution composed of water molecule:guest molecule=26:1 is prepared and cooled, a hydrate is formed at a constant temperature of the mixture of the aqueous solution and the hydrate and at a constant concentration of the guest compound in the aqueous solution. Such a temperature is called a congruent temperature.

When the concentration of the guest compound in the aqueous solution is lower than the above concentration, for example, when an aqueous solution in a ratio of 40 water molecules to 1 guest molecule is prepared, the aqueous solution is diluted as the hydrate is formed, because the formed hydrate contains 26 water molecules per guest molecule. Thus, the concentration of the guest compound in the aqueous solution and the temperature for forming the hydrate is decreased as the formed hydrate is increased.

In such a case, the slurry is not coagulated. The slurry has a high fluidity. Thus, the slurry is easily stored and transported. The slurry which has the high fluidity can be applied to the conventional air conditioners using the chilled water, as is or after minor modifications. Consequently, the use of the slurry contributes to decreased facility costs.

This embodiment is not limited to the above-mentioned apparatus.

Figure 9:
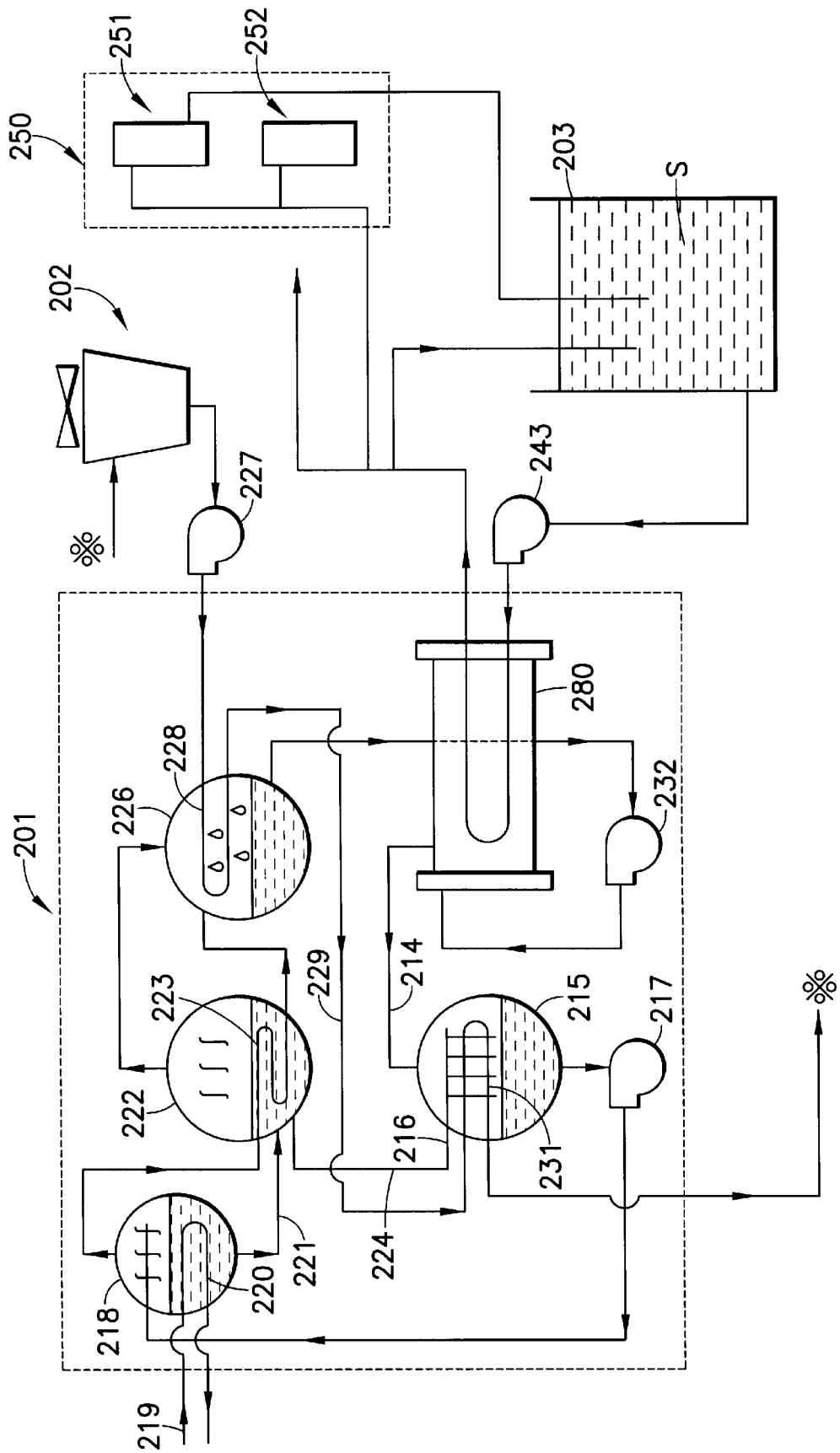
FIG. 9 is an outlined schematic diagram of a modification of the Preferred Embodiment 2 in accordance with the present invention.

FIG. 9 shows an modification of the Preferred Embodiment 2 in the present invention. In this modification, a heat exchanger 280 is provided in place of the evaporator in the absorption refrigerating machine 201. An aqueous solution of, for example, TBAB is cooled to form a hydrate slurry by direct heat exchange between the water as a refrigerant, which is evaporated in the heat exchanger 280, and the aqueous solution.

Figure 10:
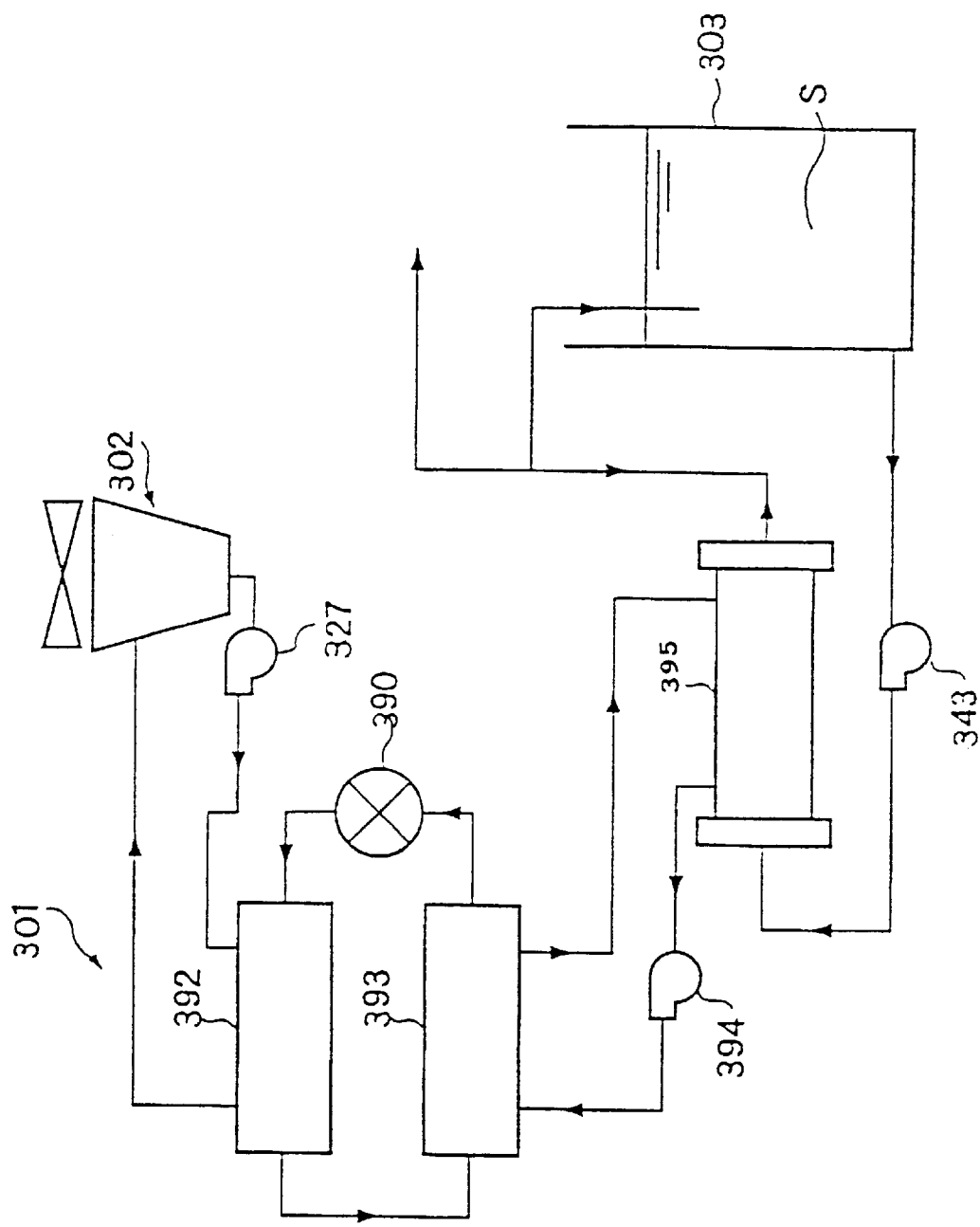
FIG. 10 is an outlined schematic diagram of an another modification of the Preferred Embodiment 2 in accordance with the present invention.

FIG. 10 shows another modification of this embodiment using a compression refrigerating machine in place of the absorption refrigerating machine. The compression refrigerating machine has a compressor 390. The refrigerant (e.g., freon, hereinafter referred to as flon) compressed by the compressor 390 is cooled and condensed in a condenser 392 by cooling water from a cooling tower 302 and is evaporated in an evaporator 393 to be cooled. Heat exchange is performed between the cooled refrigerant and the water in the evaporator 393. The refrigerant is circulated via a heat exhchanger 395 by a pump 394 to cool, for example, an aqueous TBAB solution in the heat exchanger 395 so as to form a hydrate slurry.

A variety of energy sources can be used as driving forces for the compressor 390 in this modification. For example, in case of using an electric power, the hydrate slurry is produced and stored using off-peak power in the midnight and the cooling potential can be used in air conditioners during the daytime.

Figure 11:
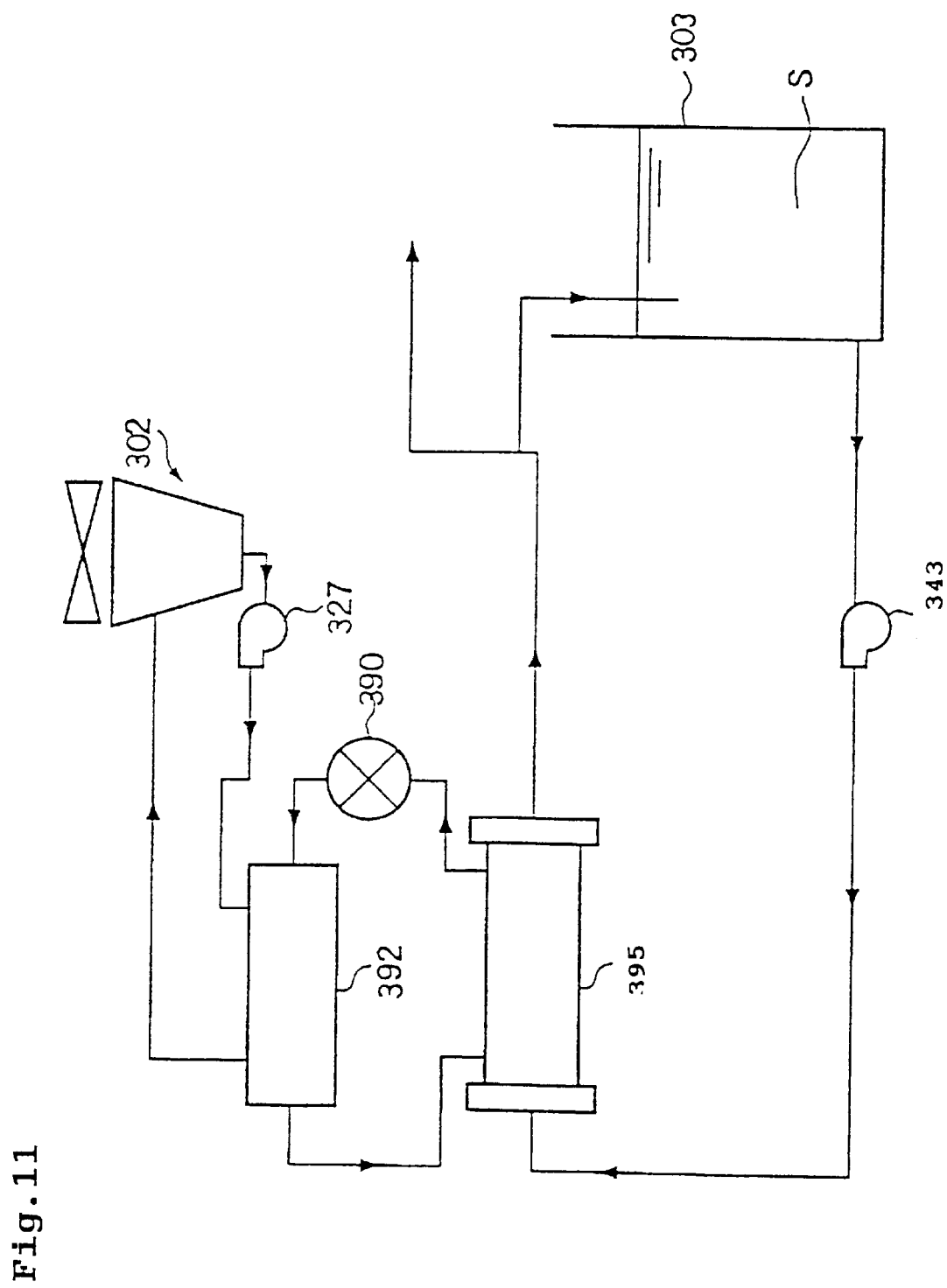
FIG. 11 is an outlined schematic diagram of another modification of the Preferred Embodiment 2 in accordance with the present invention.

FIG. 11 shows another modification of this embodiment. In this modification, a refrigerant cooled in a condenser 392 is directly evaporated in a heat exchanger 395 to cool, for example, an aqueous TBAB solution fed into the heat exchanger 395 by a pump 343 so as to form a hydrate slurry. The system in this modification has a simplified configuration and a high heat exchange efficiency due to direct heat exchange between the refrigerant in the refrigerating machine and the aqueous solution. In FIG. 11, parts having the same functions as in the above-mentioned FIG. 10 are referred to with the same numerals, and a detailed description thereof with reference to drawings has been omitted.

In this embodiment, any refrigerating machine and any energy source may be used in addition to the above-described refrigerating machines and energy sources. The apparatuses in the this embodiment also may be used in thermal storage apparatuses other than air conditioners.

Preferred Embodiment 3

The clathrate hydrates in this embodiment include crystallized compounds in which guest molecules are trapped in cage clathrate lattices of water molecules (host molecules). Examples of the guest compounds include tetra-n-butylammonium salts, such as tetra-n-butylammonium fluoride (n-$C_4H_9$)$_4$NF), tetra-n-butylammonium chloride (n-$C_4H_9$)$_4$NCl), and tetra-n-butylammonium bromide (n-$C_4H_9$)$_4$NBr); tetra-iso-amylammonium salts; tetra-n-butylphosphonium salts; and tri-iso-amylsulfonium salts.

The fluoride, chloride, and bromide may be replaced with acetate ($CH_3CO_2$), bicarbonate ($HCO_2$), chromate ($CrO_4$), tungstate ($WO_4$), oxalate ($C_2O_4$), and phosphate ($HPO_4$). The other guest compounds may have these anionic groups.

The thermal storage system in this embodiment will now be described with reference to tetra-n-butylammonium bromide TBAB, ($C_4H_9$)$_4$NBr.

Figure 12:
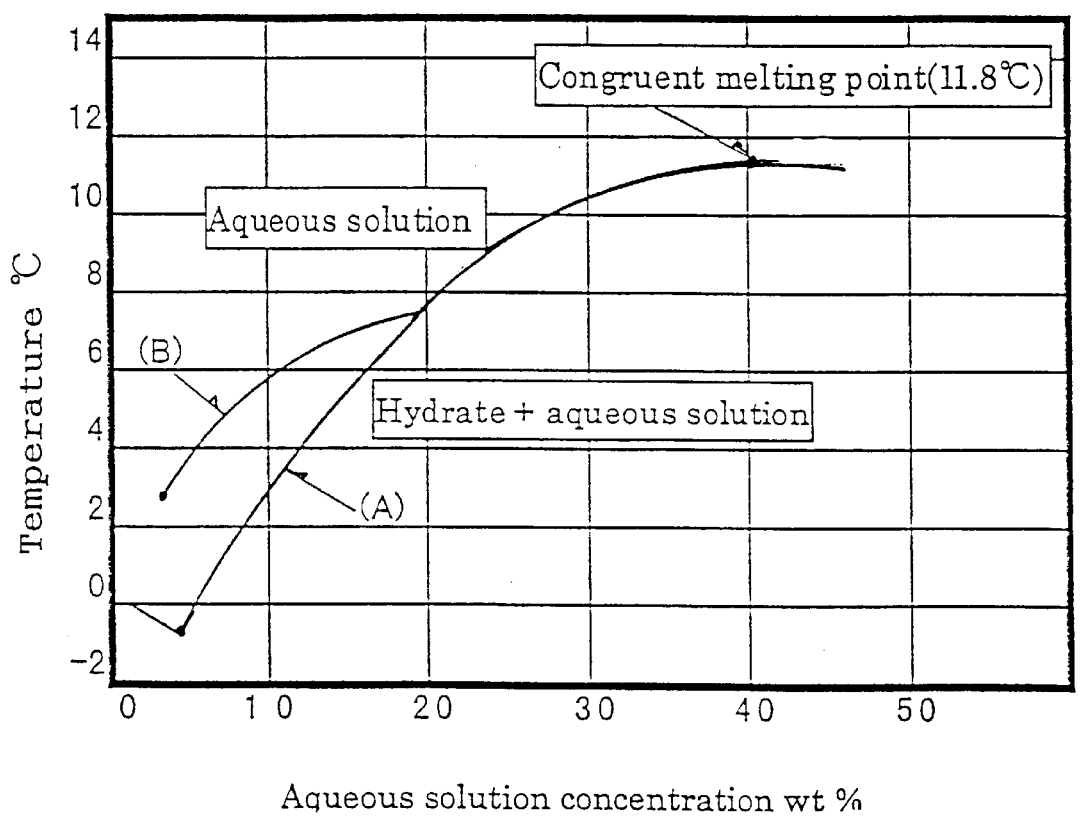
FIG. 12 is a graph of the relationship between the melting point and the concentration of a material for forming a clathrate hydrate in the aqueous solution in the Preferred Embodiment 3 in accordance with the present invention.

FIG. 12 is a graph showing the relationship between the melting point and the salt concentration in the aqueous solution. The formation and decomposition of the clathrate hydrate are represented by the following reaction formula (1):

$$(C_4H_9)_4NBr + nH_2O \rightleftharpoons (C_4H_9)_4NBr \cdot nH_2O \quad (1)$$

wherein n is the number of water molecules participating in hydration, is approximately 26.

With reference to FIG. 12, the aqueous solution containing the material for forming the clathrate hydrate, that is, the guest compound, has a maximum melting point of 11.8° C. when the salt concentration in the aqueous solution is approximately 40 percent by weight. The maximum melting point is called a congruent melting point. At the maximum melting point, the TBAB concentration in the aqueous solution is equal to the TBAB concentration in the clathrate hydrate.

When an aqueous solution having a TBAB concentration (40 percent by weight) causing the congruent melting point is cooled, clathrate hydrate starts to be formed at the congruent melting point (11.8° C.), and the congruent melting point is maintained until the aqueous solution is completely changed into the clathrate compound hydrate. When the clathrate hydrate is decomposed or melted, the cooling potential is released at a constant melting point. The latent heat of fusion is approximately 46 kcal/kg. When the utilized maximum temperature is 12° C., the volume fraction of the hydrate is 56% and the thermal storage density is 26 kcal/kg.

This thermal storage medium having such a large thermal storage density has stable thermal characteristics. Since this TBAB has been used as a catalyst, this is commercially available, economical and safe.

When an aqueous solution having a salt concentration lower than the salt concentration causing the congruent melting point (for example, 27.2 percent by weight at room temperature) is cooled, the hydrate starts to be formed at approximately 9.4° C., the TBAB concentration in the aqueous solution is gradually decreased and the temperature for forming the hydrate is simultaneously decreased. Along the curve of the hydrate number 26, as shown in FIG. 12, the temperature for forming the hydrate is decreased. When the aqueous solution is cooled to 5° C. in order to produce water or air at 15° C. suitable for air conditioning, the TBAB concentration in the aqueous solution reaches approximately 17 percent by weight. Herein, 43% of the aqueous solution is converted to the hydrate, and the accumulated heat is approximately 26 kcal/kg, wherein the specific heat of the hydrate is 0.53 kcal/kgK, and the specific heat of the aqueous solution is 0.96 kcal/kgK.

Furthermore, the clathrate hydrate by TBAB generates a hydrate whose number is approximately 36, when TBAB concentration is approximately 20 wt % or less, as shown in FIG. 12. When the hydrate is generated in the absorption refrigerating machine and when the latent heat of the clathrate hydrate is used, the TBAB concentration must be at least 4 percent by weight at room temperature.

The aqueous solution having a salt concentration lower than the congruent concentration has the following additional advantages.

(1) Since the melting point (forming temperature) of the hydrate is shifted to the lower temperature side, a cooling potential having a lower temperature can be accumulated. Thus, a cooling potential having a lower temperature is used.

Figure 13:
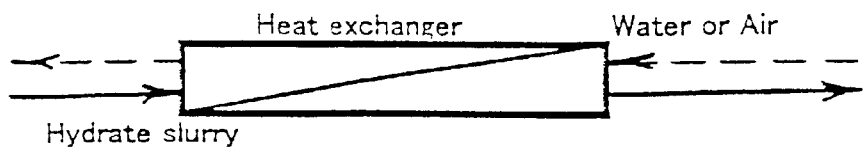
FIGS. 13(a),13(b),13(c),13(d) are illustrative charts of a concept of heat exchanger and a change in temperature in a heat exchanger when an aqueous solution containing a material for forming a clathrate hydrate is used as a thermal storage medium in the Preferred Embodiment 3, and the aqueous solution has a concentration of the material which causes a congruent melting point in FIG. 13(a),13(b) or a concentration lower than the concentration causing a congruent melting point in FIG. 13(c),13(d) in the Preferred Embodiment 3.
Figure 13:
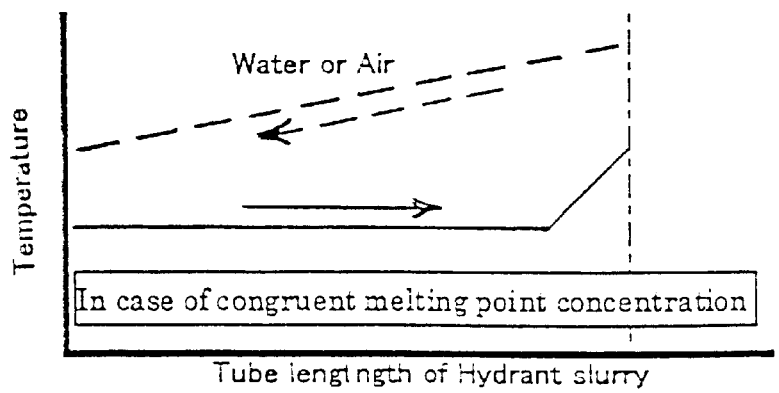
Figure 13:
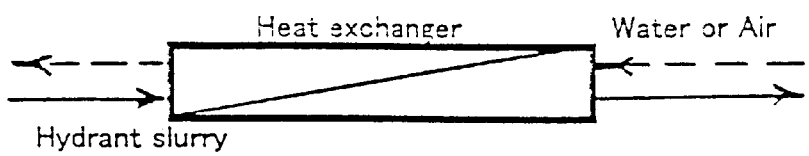
Figure 13:
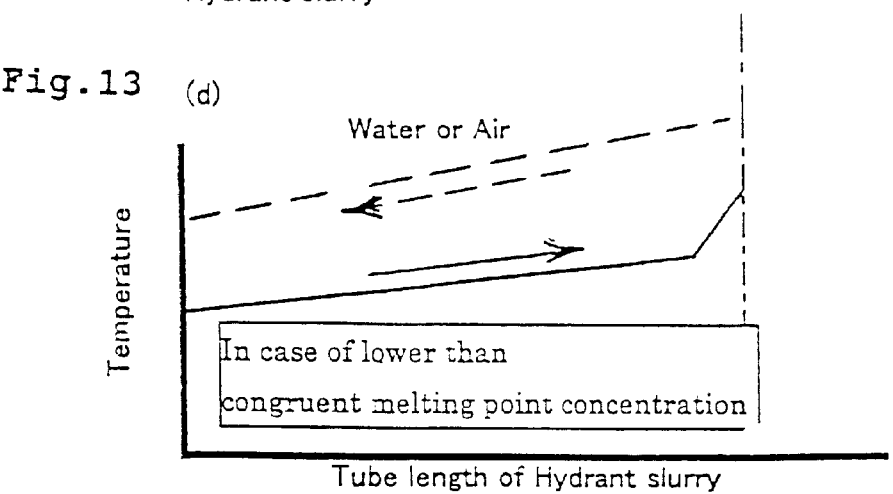

(2) Since the melting point (forming temperature) of the hydrate is shifted to the lower temperature side, the difference in temperature during heat exchange between the hydrate and water or air is constant and large. Thus, a high heat exchange efficiency is achieved, and the heat exchanger can be made compact. When water or air at 20° C. is cooled to 15° C. by a heat exchanger, the temperature of the thermal storage medium at the outlet side of the water or air (or inlet side of the thermal storage medium) is 11.8° C. and the difference in temperature is merely 3.8° C. for the congruent concentration, as shown in FIG. 13(a), FIG. 13(b), whereas the temperature of the thermal storage medium is 5° C. and the difference in temperature is 10° C. for a salt concentration lower than the congruent concentration, as shown in FIGS. 13(c)(d).

(3) For substantially the same utilized maximum temperature and the same thermal storage density, the TBAB concentration in the aqueous solution can be decreased. Thus, material costs can be decreased.

(4) For substantially the same utilized maximum temperature and the same thermal storage density, the volume fraction of the hydrate can be reduced. Transfer and storage of the hydrate slurry can be easily performed. The accumulated heat is represented by the sum of the latent heat and the sensible heat. When the accumulated heat is the same, a salt concentration lower than the congruent concentration causes a larger sensible heat. Thus, the volume fraction of the hydrate can be reduced, as estimated in Table 1. (In case that the hydrate number is approximately 26.)

TABLE 1

| Initial Concentration of Aqueous Solution | Hydrate Fraction | Accumulated Heat | Utilized Temperature Range *1 |
|---|---|---|---|
| 40% by weight | 56% | 26 kcal/kg | 11.8 to 12° C. |
| 27% by weight | 43% | 26 kcal/kg | 5 to 12° C. |

*1: The maximum temperature is set to be 12° C.

In this embodiment, the aqueous solution may contain a compound having a freezing point lower than that of water in order to decrease the melting point (forming temperature) of the clathrate compound hydrate.

For example, the congruent melting point of n-butylammonium bromide TBAB $(C_4H_9)_4NBr$ is 11.8° C., and the relationship between the melting point and the salt concentration in the aqueous solution is shown in FIG. 12. When a melting-point-lowering agent (having a lower melting point than that of water), such as ethylene glycol or propylene glycol, is added to the aqueous solution, the melting point of the aqueous solution is decreased in response to the content of the agent. A thermal storage medium having a desired melting point can be formed by adding an adequate amount of melting-point-lowering agent when the lower limit of the utilized temperature range is decreased.

As described above, the thermal storage medium in this embodiment has a large thermal storage density and stable thermal characteristics. Since this TBAB has been used as a catalyst, this is commercially available, economical and safe. When an aqueous solution having a salt concentration lower than the congruent concentration is used, a cooling potential having a lower temperature can be accumulated and used. Since this aqueous solution has a high heat exchange efficiency, a compact heat exchanger can be used at low cost. In addition, transport and storage of the hydrate slurry are simplified.

By adding an adequate amount of compound having a lower melting point than that of water, a thermal storage medium having a lower melting point can be prepared using an aqueous solution containing the same hydrate. This method can expand the use of the thermal storage medium and can decrease material costs.

Preferred Embodiment 4

This embodiment of the present invention relates to an air conditioner having a refrigerating machine and a thermal storage apparatus containing an aqueous solution of a guest compound forming a hydrate at a temperature of higher than 0° C. This air conditioner has a heat exchanger for cooling the aqueous solution by a heat transfer medium from the refrigerating machine to form a hydrate slurry including hydrate particles, and a circulation system for feeding the hydrate slurry to a load-side device of the air conditioner.

By the latent heat of the hydrate, a large amount of cooling potential can be accumulated. Such a system compensates for imbalances between a change in supplied exhaust heat and a change in load on air conditioners and can more effectively use energy. For example, off-peak power in the midnight and variable-output forms of energy, such as exhaust heat from factories, are accumulated as a cooling potential, and the accumulated cooling potential is used in air conditioners. Furthermore, the hydrate slurry is stable and has high fluidity. Thus, the hydrate slurry, as it is, can be fed into a load-side device by a pump, as in conventional refrigerants and brine. Accordingly, the air conditioner can be simplified and made compact.

In this embodiment, the guest compound contains at least one compound selected from the group consisting of tetra-n-butylammonium salts, tetra-iso-amylammonium salts, tetra-iso-butylphosphonium salts, and tri-iso-amylsulfonium salts.

Since the melting points of these guest compounds range from 4° C. to 25° C., there is a small difference in temperature between a heat absorption section and a heat dissipation section in the refrigerating machine, resulting in improved heat efficiency. Since the temperature of the heat absorption section is higher than 0° C., the refrigerating machine may be an absorption refrigerating machine using water as a refrigerant. Since this absorption refrigerating machine can use exhaust heat at a relatively low temperature, such as low-temperature vapor, from factories, as an energy source.

In this embodiment, the refrigerating machine may be another absorption refrigerating machine which produces a cooling potential by evaporation of water as a refrigerant, and absorbs the formed water vapor in an absorbing solution, and concentrates the absorbing solution by heat from a heat source. This refrigerating machine can effectively use exhaust heat at a relatively low temperature.

In this embodiment, the refrigerating machine may be a compression refrigerating machine which condenses a refrigerant by compression and evaporates the condensed refrigerant to produce a cooling potential. The compression can more effectively use electrical power by accumulating off-peak power in the midnight.

The methods and apparatuses in accordance with the this embodiment will now be described with reference to the attached drawings.

Figure 14:
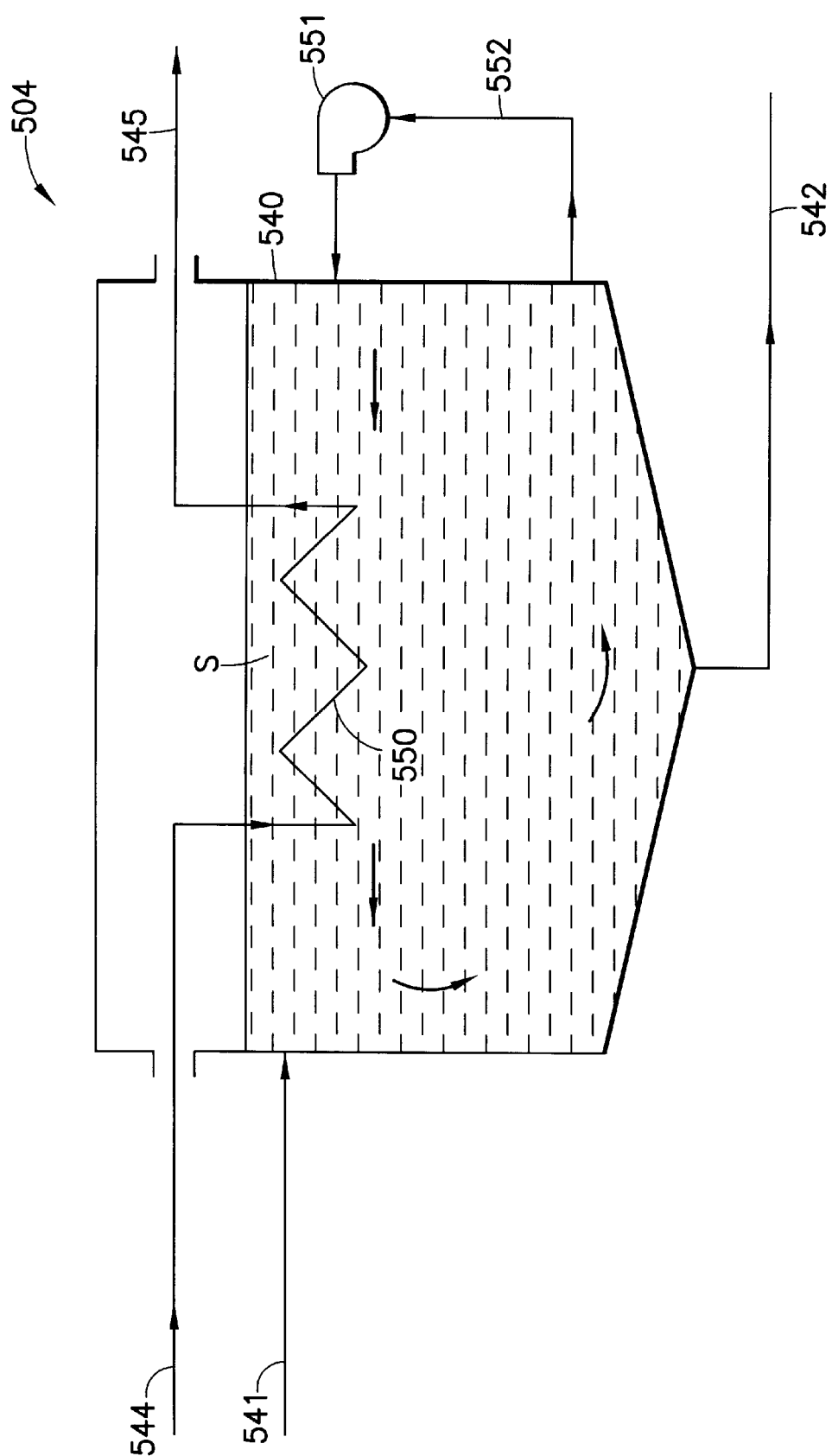
FIG. 14 is an outlined schematic diagram of the Preferred Embodiment 4 in accordance with the present invention.

FIG. 14 shows a configuration of the heat exchanger 504 for forming the hydrate slurry. The aqueous TBAB solution S is fed from the thermal storage tank 506 into a cooling vessel 540 via a tube 541. The aqueous solution including the hydrate slurry is recycled to the thermal storage tank 506 from the bottom of the cooling vessel 540 via a tube 542.

The cooling vessel 540 is an open type communicating with the atmosphere. The internal pressure thereof is atmospheric pressure, and the open surface of the circulating aqueous solution S is in contact with air.

A heat exchange element 550, such as a cooling tube, is provided on the cooling vessel 540. The cooling water as the refrigerant formed in the absorption refrigerating machine 501 is fed into the heat exchange element 550 via tubes 545 and 545 to cool the circumferential aqueous solution. The cooling vessel 540 has a circulation mechanism including a pump 551 and a tube 552 and recycles the aqueous solution S to the heat exchange element 550.

Figure 15:
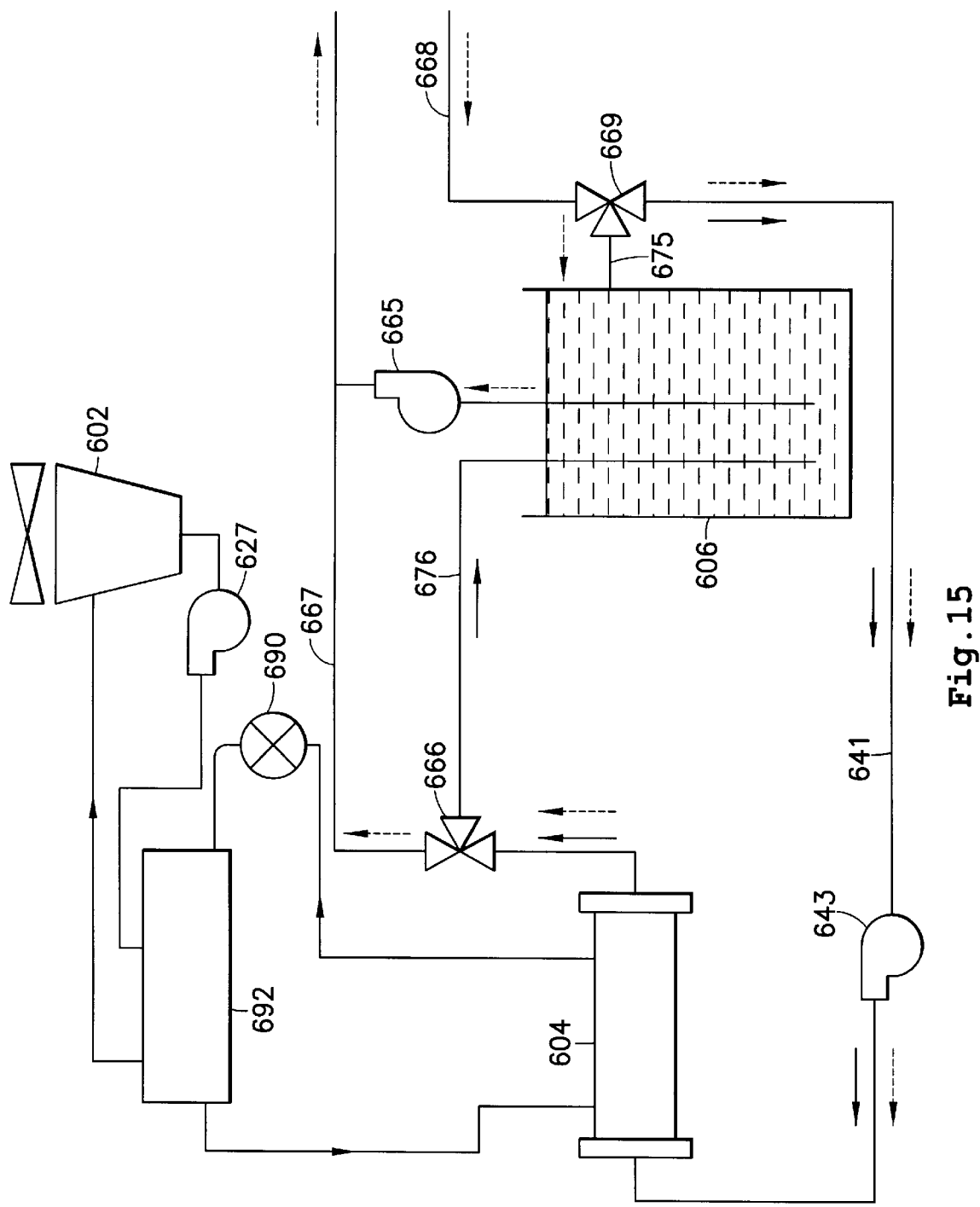
FIG. 15 is an outlined schematic diagram of the Preferred Embodiment 4 in accordance with the present invention.

FIG. 15 shows another concept of this embodiment.

FIG. 15 shows a heat exchanger 604, a thermal storage tank 606, and a piping system connected to a load side of an air conditioner, as an modification of this embodiment. In this modification, a refrigerating machine is effectively operated during the night to form and accumulate a hydrate slurry, and the cooling potential accumulated in the hydrate is used for load operation of an air conditioner.

The piping system includes an outward tube 667 for supplying the hydrate slurry from the heat exchanger 604 to the load side of the heat exchanger for the air conditioner and an inward tube 668 for recycling the hydrate slurry from the load side. The outward tube 667 is provided with a valve 666 midway thereof, and a tube 676 connected to the thermal storage tank 606 is branched therefrom. A pump 665 supplies the hydrate slurry at the thermal storage tank 603 to a midway portion of the outward tube 667. A valve 669 provided midway of the inward tube 668 communicates with the thermal storage tank 606 via a tube 675.

In this modification, a diluted aqueous solution not causing the congruent temperature is used.

Solid arrows in FIG. 15 indicate the stream of the hydrate slurry during a thermal storage operation during off-peak times in the night and broken arrows indicate the stream of the hydrate slurry during a load operation during the daytime.

In the thermal storage operation, the aqueous solution in the thermal storage tank 606 is fed into the heat exchanger 604 via the tube 675, the valve 669, the tube 641 and the pump 643 to form the hydrate slurry. The hydrate slurry is recycled to the thermal storage tank 606 via the valve 666 and the tube 676.

In the load operation during the daytime, the pump 665 draws the hydrate particles from the thermal storage tank 606 and supplies them to the load side of the heat exchanger for the air conditioner via the outward tube 667. The hydrate slurry heat-exchanged in the load side is recycled to the thermal storage tank 606 via the inward tube 668, the valve 669 and the tube 675.

When the cooling load is large during the load operation during the daytime, a refrigerating machine is simultaneously operated. A fraction of the hydrate slurry in the inward tube 668 is divided by the valve 669, fed into the heat exchanger 604 via the tube 641 and the pump 643 to form the hydrate slurry. The hydrate slurry in the heat exchanger 604 is recycled to the outward tube 667 by the valve 666 and joins the hydrate slurry drawn from the thermal storage tank 606.

This modification can improve the operational efficiency of the refrigerating machine. As the amount of the hydrate particles increases in the aqueous solution, the temperature for forming the hydrate decreases due to dilution of the aqueous solution. The temperature of the endothermic section of the refrigerating machine is decreased in response to such a phenomenon to decrease the operational energy necessary for the refrigerating machine.

When the load operation and the operation of the refrigerating machine are simultaneously performed during the daytime, the aqueous solution concentrated and heated by the heat exchange is predominantly fed into the heat exchanger 604 from the load side. Hydrate particles are formed from this aqueous solution at a higher temperature so that the temperature of the endothermic section of the refrigerating machine is increased. Since the difference in temperature between the endothermic section and the heat dissipating section is small, the operational efficiency of the refrigerating machine is improved.

As the amount of the hydrate particles increases in the thermal storage tank 606, the aqueous solution is diluted and the temperature for forming the hydrate is decreased, resulting in a decreased efficiency of the refrigerating machine. When the capacity of the thermal storage tank 606, that is, the total volume of the aqueous solution is controlled to a proper level taking into consideration the capacity of the load side of the air conditioner and the capacity of the refrigerating machine, the refrigerating machine can be operated with the above-mentioned high efficiency in ordinary operational modes.

Figure 16:
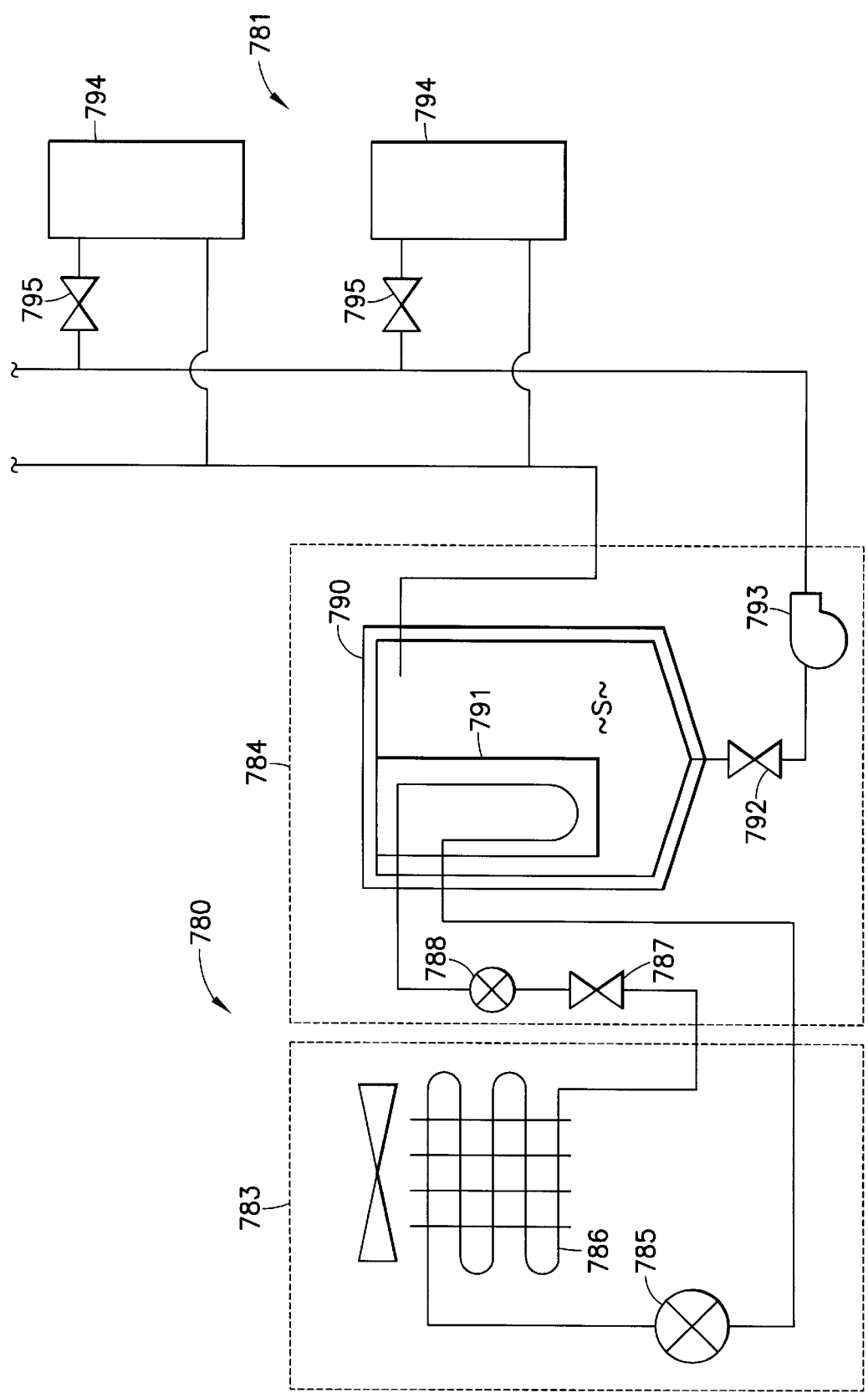
FIG. 16 is an outlined schematic diagram of the Preferred Embodiment 4 in accordance with the present invention.

FIG. 16 shows another modification of this embodiment. This modification uses a compression refrigerating machine, which forms a cooling potential evaporating a refrigerant which was condensed by compression. This modification is suitable for compact air conditioners for domestic use and small buildings.

In this FIG. 16, the air conditioner includes an outdoor unit 780 and a load-side device 781. The load-side device 781 has a plurality of indoor units 794. The outdoor unit 780 has a refrigerating machine 783 and a thermal storage apparatus 784.

The refrigerating machine 783 is provided with a compressor 785. A refrigerant such as flon is compressed by the compressor 785 and condensed by a condenser 786. The condensed refrigerant is evaporated to form a cooling potential via a control valve 787 and an expansion valve 788. The evaporated refrigerant is recycled to the compressor 785.

The thermal storage apparatus 784 include an integrated thermal storage tank 790 having a heat insulating structure. The thermal storage tank 790 contains an aqueous solution S of a guest compound, for example, TBAB. The thermal storage tank 790 has a heat exchanger 791 therein. The refrigerant from the refrigerating machine 783 is fed into the heat exchanger 791 to cool the aqueous solution in the thermal storage tank 790 and to form hydrate particles.

The hydrate slurry of a mixture of the hydrate particles and the aqueous solution is stored in the thermal storage tank 790, is fed into each indoor unit 794 via the control valve 792 by a pump 793. The hydrate slurry or aqueous solution after heat-exchange with air is recycled to the thermal storage tank 790. A flow control valve 795 controls the flow rate of the hydrate slurry fed into each indoor unit 794.

In this modification, the hydrate slurry is formed by operation of the compressor 785 using off-peak power in the midnight or the like and is stored in the thermal storage tank 790. During the daytime, the hydrate slurry stored in the thermal storage tank 790 is fed to each indoor unit 794 for air conditioning. Thus, this system can effectively use off-peak power in the midnight. In addition, the overall system can be made compact.

Figure 17:
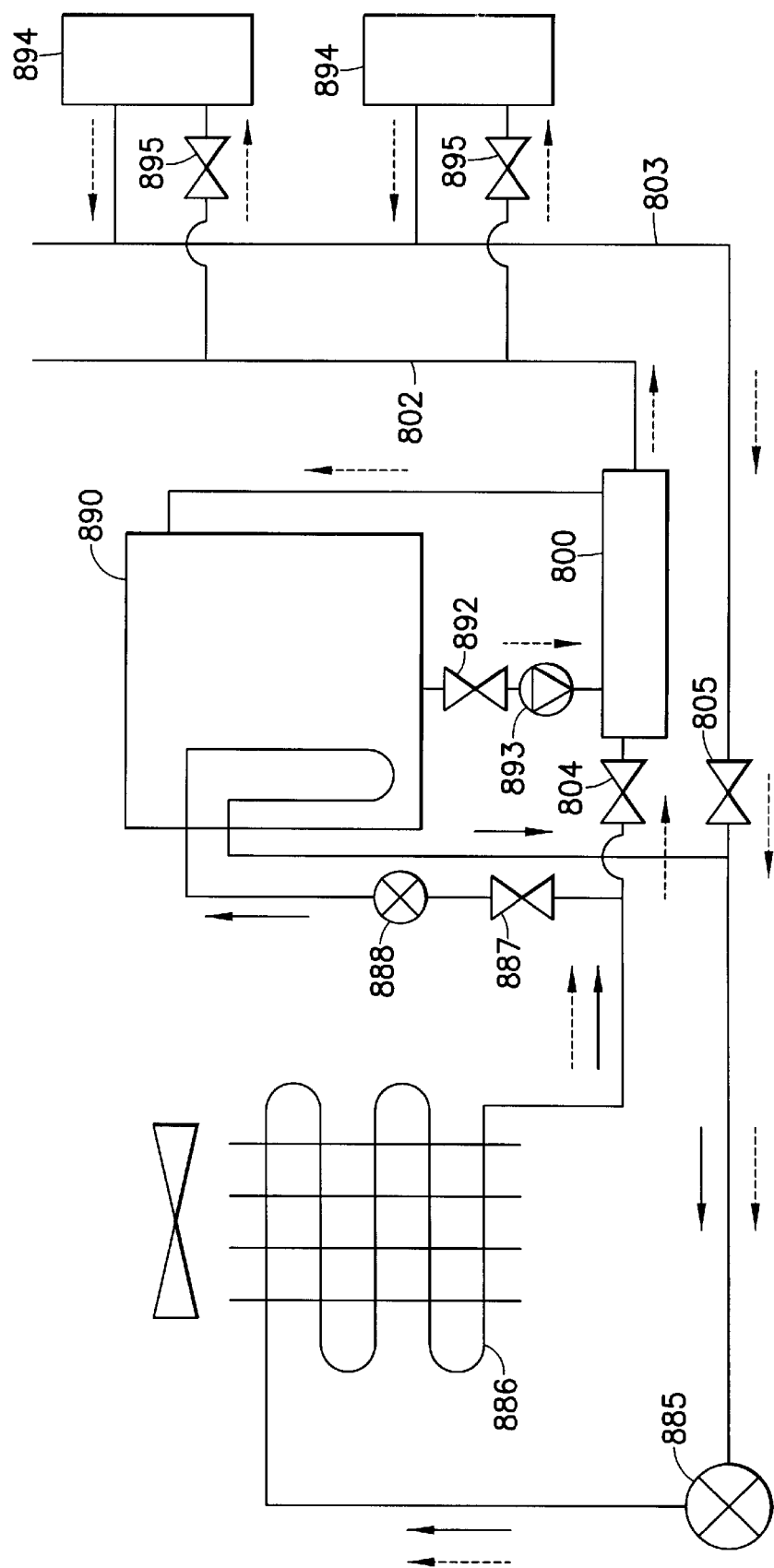
FIG. 17 is an outlined schematic diagram of the Preferred Embodiment 4 in accordance with the present invention.

FIG. 17 shows another modification of this embodiment in the present invention. In this modification, the stored hydrate slurry is fed into a load side to heat-exchange with a refrigerant such as flon. Furthermore, the refrigerating machine is operable while the hydrate slurry stored in the thermal storage tank 890 is used as a cooling potential source.

The thermal storage apparatus has a refrigerant heat exchanger 800 performing heat exchange between the hydrate slurry from the thermal storage tank 890 and the refrigerant. The refrigerant is circulated between the refrigerant heat exchanger 800 and indoor units 894 at a load side via an outward tube 802 and an inward tube 803. The hydrate slurry in the thermal storage tank 890 is fed into the refrigerant heat exchanger 800 via a valve 892 and a pump 893. The refrigerant is cooled or condensed by heat exchange with the hydrate slurry. The refrigerant in the refrigerant heat exchanger 800 is circulated to a compression refrigerating machine via valves 804 and 805.

Solid arrows in the drawing indicate the stream of the refrigerant in a thermal storage operation during off-peak hours, and broken arrows indicate the stream in a load operation during the daytime.

In this modification, the refrigerating machine is operated in the load operation during the daytime. A part of gaseous or liquid refrigerant from the condenser 886 is fed into the refrigerant heat exchanger 800 and cooled or condensed by heat exchange with the hydrate slurry. The cooled refrigerant is fed into the indoor units 894 at the thermal load side. The refrigerant recycled from the indoor units 894 is compressed by the compressor 885 and is circulated to the condenser 886.

In this modification, the refrigerant is delivered to the indoor units 894. Thus, any conventional indoor units using any refrigerant can be used in this modification as is. In addition, the hydrate slurry in the thermal storage tank 890 and the refrigerating machine can be simultaneously used as a cooling potential sources. Thus, the apparatus can be flexibly respond to a change in load. Any type of refrigerating machine can be used in the present invention.

Since a cooling potential is stored using the hydrate in the third embodiment, as described above, a large thermal storage capacity can be achieved using a compact apparatus. When the guest compound for forming the hydrate is selected so that the temperature for forming the hydrate is higher than 0° C., the hydrate slurry of the aqueous solution can be formed. A simplified and compact apparatus can easily deliver the slurry to a load-side device.

Figure 18:
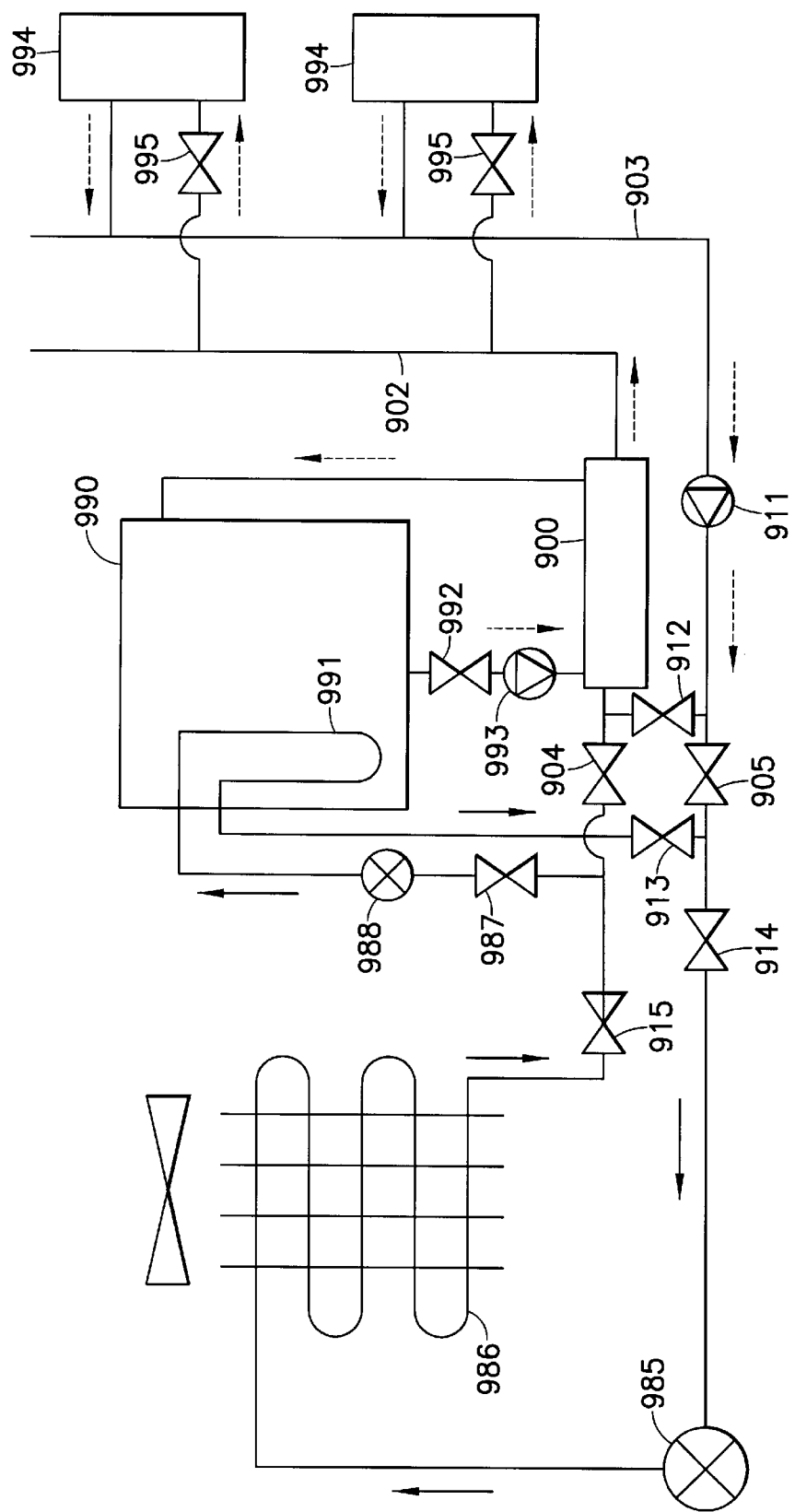
FIG. 18 is an outlined schematic diagram of the Preferred Embodiment 4 in accordance with the present invention.

FIG. 18 shows another modification of this embodiment in the present invention. In this modification, a refrigerant gas pump 911, and valves 912,913,914 and 915 are provided midway of the inward tube 903 for a refrigerant so that the refrigerant can be directly circulated between indoor units 994 and a refrigerant heat exchanger 900, not via the compressor 985 of the refrigerating machine.

Also, in this modification, the refrigerant is delivered to the indoor units 994. Thus, any conventional indoor units using any refrigerant can be used in this modification as is. This apparatus may be operated in various modes in consideration of environmental conditions; such as operation using only the hydrate slurry in the thermal storage tank 990 as a cooling potential source, operation using only the refrigerating machine as a cooling potential source, and operation using both the hydrate slurry and the refrigerating machine as a cooling potential sources. Furthermore, this invention is not limited to the above-mentioned modification. For example, the heat exchanger (e.g., 800, 900) can be installed in the thermal storage tank. Various types of refrigerating machines can be used in the present invention. Since cooling potential is stored using the hydrate in the third embodiment, as described above, a large thermal storage capacity can be achieved using a compact apparatus.

What is claimed is:

1. A method for making a hydrate slurry comprising:
   (a) preparing an aqueous solution containing a guest compound for forming a clathrate hydrate in a channel;
   (b) cooling the aqueous solution by circulating the aqueous solution so that the aqueous solution is in contact with a heat transfer face to form hydrate particles in the aqueous solution;
   (c) contacting the circulating aqueous solution with nuclear particles, the nuclear particles being fine particles;
   (d) precipitating the fine particles which have a higher gravity than the aqueous solution;
   (e) supplying the precipitated fine particles to the circulating aqueous solution to float the precipitated fine particles in the aqueous solution; and
   (f) permitting the precipitated fine particles to be adhered to a surface of a member in contact with the circulating aqueous solution.

2. The method of claim 1, wherein the nuclear particles are the hydrate particles.

3. The method of claim 1, further comprising in step (d) precipitating the fine particles on a bottom of the channel.

4. The method of claim 1, wherein the guest compound is at least one compound selected from the group consisting of a tetra-n-butylammonium salt, a tetra-iso-amylammonium salt, a tetra-iso-butylphosphonium salt and a tri-iso-amylsulfonium salt.

5. An apparatus for making a hydrate slurry comprising:
   a cooling apparatus to cool an aqueous solution containing a guest compound to form hydrate particles, the cooling apparatus comprising a heat exchanger having a heat transfer face for cooling the aqueous solution, wherein the aqueous solution is simultaneously circulated and cooled by contact with the heat transfer face; and
   a nuclear particle-supply mechanism for supplying nuclear particles to the aqueous solution circulating in the heat exchanger.

6. The apparatus of claim 5, wherein the nuclear particle-supply mechanism is a hydrate particle-forming mechanism capable of being operated independent of the heat exchanger.

7. The apparatus of claim 5, wherein the nuclear particle-supply mechanism has a storage vessel for storing a part of a hydrate slurry formed in the heat exchanger.

8. The apparatus of claim 5, wherein the nuclear particle-supply mechanism has a fine particle recovery tube which recovers fine particles precipitated on a bottom of a channel for the aqueous solution and which supplies the fine particles to the heat exchanger.

9. An apparatus for making a hydrate slurry comprising:
   a cooling apparatus to cool an aqueous solution containing a guest compound to form hydrate particles, the cooling apparatus comprising a heat exchanger having a heat transfer face for cooling the aqueous solution, wherein the aqueous solution is simultaneously circulated and cooled by contact with the heat transfer face and a fine particle layer is adhered to at least a part of a surface of a member in the heat exchanger in contact with the aqueous solution and acts as nuclei to initiate the formation of the hydrate particles.

10. The apparatus of claim 9, wherein the heat exchanger has a cylindrical heat transfer face; and the heat exchanger further comprises a rotating blade member which is slidable on the heat transfer face for detaching hydrate formed on the heat transfer face;
    wherein a fine particle layer adheres to a surface of the rotating blade member.

11. An apparatus for making a hydrate slurry comprising:
    a device to cool an aqueous solution containing a material for forming a clathrate hydrate as a guest compound to form hydrate particles:
    a refrigeration machine;
    a device to exchange heat between the refrigeration machine and the aqueous solution; and
    a device to circulate the aqueous solution through the device to exchange heat.

12. A thermal storage method using a clathrate hydrate comprising:
    (a) preparing an aqueous solution containing a material for forming the clathrate hydrate so that the aqueous solution has a concentration of the material which provides a congruent melting point or lower; and (b) cooling the aqueous solution to form the clathrate hydrate.

13. The thermal storage method of claim 12, wherein the aqueous solution further contains a melting-point-lowering agent.

14. The thermal storage method of claim 12, wherein the material for forming a clathrate hydrate is at least one compound selected from the group consisting of a tetra-n-butylammonium salt, a tetra-iso-amylammonium salt, a tetra-n-butylphosphonium salt and a tri-iso-amylsulfonium salt.

15. The thermal storage method of claim 12, wherein the material for forming the clathrate hydrate is tetra-n-butylammonium bromide, and the concentration of the material in the aqueous solution is 4 to 40%.

16. A thermal storage apparatus using a clathrate hydrate comprising:

a storage device to store an aqueous solution of a material for forming the clathrate hydrate, the aqueous solution having a concentration of the material which is not higher than a concentration causing a congruent melting point; and a cooling device to cool the aqueous solution stored in the storage device to form a slurry of the clathrate hydrate.

17. A thermal storage medium comprising an aqueous solution containing a material for forming a slurry of clathrate hydrate which is transported and is crystallized by encasing guestmolecules into clathrate lattices structured by water molecules.

18. The thermal storage medium of claim 17, wherein the aqueous solution has a concentration of the material which is a congruent melting point or lower.

19. The thermal storage medium of claim 17, further comprising a melting-point-lowering agent.

20. The thermal storage medium of claim 17, wherein the material for forming a clathrate hydrate is tetra-n-butylammonium bromide, and the concentration of the material in the aqueous solution is 4 to 40%.

21. An air conditioner comprising:

(a) a refrigeration machine; and (b) a thermal storage apparatus connected to the refrigeration machine by piping, the thermal storage apparatus stores a guest compound solution for forming a hydrate at a temperature higher than 0° C., the thermal storage apparatus comprising (i) a heat exchanger for cooling the aqueous solution by a thermal storage medium from the refrigeration machine to form hydrate slurry particles and (ii) a circulator for supplying the slurry to a load-side device of the air conditioner.

22. The air conditioner of claim 21, wherein the guest compound is at least one compound selected from the group consisting of a tetra-n-butylammonium salt, a tetra-iso-amylammonium salt, a tetra-iso-butylphosphonium salt and a tri-iso-amylsulfonium salt.

23. The air conditioner of claim 21, wherein the refrigeration machine is an absorption refrigeration machine which forms a cooling potential by evaporation of water as a refrigerant, allows an absorbent solution to absorb the resultant evaporated water, and concentrates the resultant diluted absorbent solution by a heat source.

24. The air conditioner of claim 21, wherein the refrigeration machine is a compression refrigeration machine which condenses a refrigerant by compression and forms a cooling potential by evaporation of the resultant condensed refrigerant.

25. A system for transporting a thermal storage medium comprising:

a supply conduit for supplying a thermal storage medium to a facility provided with a heat exchanger; and a recovery conduit for recovering the thermal storage medium having absorbed heat therein by contact with the heat exchanger, wherein the thermal storage medium is produced by cooling an aqueous solution of a guest compound, and the thermal storage medium is a slurry of a clathrate hydrate which is crystallized, under atmospheric conditions, by encasing a guest molecule into basket-like clathrate lattices structured by water molecules.

26. The system of claim 25, wherein the guest molecule comprises at least one compound selected from the group consisting of a tetra-n-butylammonium salt, a tetra-iso-amylammonium salt, a tetra-n-butylphosphonium salt and a tri-iso-amylsulfonium salt.

27. The system of claim 25, wherein the guest molecule is tetra-n-butyl ammonium bromide.

28. A method for transporting a thermal storage medium comprising:

supplying a transported thermal storage medium to a facility provided with a heat exchanger; and recovering the transported thermal transfer medium having absorbed heat therein by contact with the heat exchanger, wherein the thermal storage medium is produced by cooling an aqueous solution of a guest compound, the thermal storage medium is a slurry of a clathrate hydrate which is crystallized, under atmospheric conditions, by encasing a guest molecule into basket-like clathrate lattices structured by water molecules.

29. The method of claim 28, wherein the guest molecule contains at least one compound selected from the group comprising of a tetra-n-butylammonium salt, a tetra-iso-amylammonium salt, a tetra-iso-butylsulfonium salt and a tri-iso-amylsulfonium salt.

30. A transported thermal storage medium comprising a thermal storage medium produced by cooling an aqueous solution of a guest compound, and a slurry of clathrate hydrate to be transported and to be crystallized, at atmospheric conditions, by encasing a guest molecule into basket-like clathrate lattices structured by water molecules.

31. The transported thermal storage medium of claim 30, wherein the guest molecule contains at least one compound selected from the group comprising of a tetra-n-butylammonium salt, a tetra-iso-amylammonium salt, a tetra-iso-butylsulfonium salt and a tri-iso-amylsulfonium salt.

32. The transported thermal storage medium of claim 30, wherein the guest molecule is tetra-n-butylammonium bromide.

33. A thermal storage medium comprising an aqueous solution having dissolved therein a clathrate hydrate forming material at a concentration to provide a congruent melting point of the clathrate hydrate or less than said concentration, whereby a slurry of the clathrate hydrate is formed during cooling of the aqueous solution at atmospheric conditions.

34. The thermal storage medium of claim 33, wherein the clathrate hydrate forming material is at least one compound selected from the group consisting of a tetra-n-butylammonium salt, a tetra-iso-amylammonium salt, a tetra-iso-butylsulfonium salt and a tri-iso-amylsulfonium salt.

35. The thermal storage medium of claim 33, wherein the aqueous solution contains fine particles which are nuclei formed by particles of the clathrate hydrate; and the clathrate hydrate is formed by supercooling the aqueous solution to the melting point or below of the clathrate hydrate at atmospheric conditions.

36. A method for storing a thermal storage medium comprising:

cooling an aqueous solution having dissolved therein a material for forming a clathrate hydrate so that the aqueous solution has a concentration of the material which provides a congruent melting point or lower; and storing a slurry of the clathrate hydrate formed by cooling the aqueous solution at atmospheric conditions.

37. A method for transporting a thermal storage medium comprising:

cooling an aqueous solution having dissolved therein a material for forming a clathrate hydrate so that the aqueous solution has a concentration of the material which provides a congruent melting point or lower; and transporting a slurry of the clathrate hydrate formed by cooling the aqueous solution at atmospheric conditions.

38. A heat exchanging device comprising a means for exchanging heat between (i) a thermal storage medium from outside and (ii) water or air, wherein the thermal storage medium is produced by cooling an aqueous solution of a guest compound and the thermal storage medium is crystallized, at atmospheric conditions, by encasing a guest molecule into basket-like clathrate lattices structured by water molecules.

39. A heat exchanging device comprising a means for exchanging heat between (i) a slurry of a clathrate hydrate and (ii) water or air, wherein the clathrate hydrate is formed by cooling an aqueous solution having dissolved therein a clathrate hydrate forming material at a concentration to provide a congruent melting point of the clathrate hydrate or less than said concentration at atmospheric conditions.

40. A heat exchanging device comprising:

a means for forming particles of a hydrate by cooling an aqueous solution having dissolved therein a clathrate hydrate forming material by a thermal storage medium disposed within an element of a heat exchanger, at atmospheric conditions, and a means for circulating the aqueous solution to flow around the element of the heat exchanger.

41. An air-conditioning method comprising:

cooling a thermal storage medium circulating between a heat exchanger and a load-side device of an air conditioner by an aqueous solution formed by cooling the aqueous solution at atmospheric conditions, the aqueous solution having dissolved therein a clathrate hydrate forming material.

42. An air-conditioning method comprising:

(a) forming a hydrate slurry by cooling an aqueous solution having dissolved therein a clathrate hydrate forming material by using a thermal storage medium supplied from a refrigerator; and (b) cooling the thermal storage medium by the hydrate slurry, at atmospheric conditions, the thermal storage medium circulating between a heat exchanger, a load-side device of an air-conditioner and the refrigerator, the refrigerator being connected to the heat exchanger.

43. An air-conditioning method comprising:

(a) forming a hydrate slurry in a first heat exchanger by cooling an aqueous solution having dissolved therein a clathrate hydrate forming material using a thermal storage medium supplied from a refrigerator; and (b) cooling a thermal storage medium by the hydrate slurry at atmospheric conditions, the thermal storage medium circulating between a second heat exchanger and a load-side device of an air-conditioner, the load-side device being connected to the second heat exchanger.

44. The method of claim 43, wherein the formation of the hydrate slurry is carried out by using a non-continuous energy supply selected from the group consisting of night-time electricity and waste heat emitted from plants.

45. An air-conditioner comprising:

a first feed pipe for supplying a thermal storage medium cooled by a hydrate slurry to a load-side device of an air-conditioner;

a first return pipe for supplying the thermal storage medium after exchanging heat in the load-side device to the heat exchanger;

a second feed pipe for supplying the thermal storage medium to form the hydrate slurry by cooling an aqueous solution having dissolved therein clathrate hydrate forming material from a refrigerator to a second heat exchanger, at atmospheric conditions; and a second return pipe for supplying the heat medium after exchanging heat in the second heat exchanger to the refrigerator.

46. The apparatus of claim 45, wherein first feed pipe and the second feed pipe are connected to each other, and the first return pipe and the second return pipe are connected to each other, enabling the thermal storage medium supplied from the refrigerator to supply the load-side device, and further comprising a switching valve to allow the thermal storage medium after exchanging heat in the load-side device to supply the refrigerator.

47. The air-conditioner of claim 45, further comprising a switching valve to allow the hydrate slurry to flow in the second return pipe.

48. The apparatus of claim 45, wherein the refrigerating machine is at least one machine selected from the group consisting of (i) an absorption refrigerator that decreases temperature by vaporizing water of a refrigerant, permitting vaporized steam to be absorbed by a solution of an absorbent and heating the solution by a heat source to concentrate the solution; and (ii) a compression refrigerator which compresses a refrigerant to condense a refrigerant and which decreases temperature by vaporizing the condensed refrigerant.

* * * * *